US009745940B2

(12) United States Patent
Morris et al.

(10) Patent No.: US 9,745,940 B2
(45) Date of Patent: Aug. 29, 2017

(54) MACHINE HAVING HYDRAULIC START ASSIST SYSTEM

(71) Applicant: Caterpillar Inc., Peoria, IL (US)

(72) Inventors: Emily Anne Morris, Peoria, IL (US); Jeremy Todd Peterson, Washington, IL (US); Jeffrey Lee Kuehn, Germantown Hills, IL (US); Dayao Chen, Bolingbrook, IL (US); Pengfei Ma, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 349 days.

(21) Appl. No.: 14/482,557

(22) Filed: Sep. 10, 2014

(65) Prior Publication Data
US 2015/0247513 A1 Sep. 3, 2015

Related U.S. Application Data

(63) Continuation-in-part of application No. 14/263,680, filed on Apr. 28, 2014, now abandoned.
(Continued)

(51) Int. Cl.
F16D 31/02 (2006.01)
F02N 7/08 (2006.01)
(Continued)

(52) U.S. Cl.
CPC .............. F02N 7/08 (2013.01); E02F 9/2066 (2013.01); E02F 9/2217 (2013.01);
(Continued)

(58) Field of Classification Search
CPC .......... F15B 1/024; F15B 1/022; F15B 21/14; F15B 2211/214; F15B 2211/851; F15B 2211/8752
See application file for complete search history.

(56) References Cited

U.S. PATENT DOCUMENTS 3,667,442 A 6/1972 Bredlow
3,820,444 A 6/1974 Ward
(Continued)

FOREIGN PATENT DOCUMENTS

CN 102620037 A 8/2012
EP 2546552 A1 1/2013
(Continued)

OTHER PUBLICATIONS

"Hydraulic starting systems for diesel engines". Brochure [online]. IPU Group, 2009 [retrieved on May 2013]. Retrieved from the Internet: <URL:ipustarting.co.uk/en/downloads/static/downloads/hydraulic_starting_systems_for_diesel_engines.pdf>.
(Continued)

Primary Examiner — Thomas E Lazo
Assistant Examiner — Daniel Collins
(74) Attorney, Agent, or Firm — Finnegan, Henderson, Farabow, Garrett & Dunner, LLP; William R. Tinker; Jeffrey A. Greene

(57) ABSTRACT

A hydraulic system is disclosed for assisting starting of a machine having an engine. The hydraulic system may include a work tool, a pump driven by the engine to pressurize fluid, and an actuator configured to receive pressurized fluid from the pump and move the work tool. The hydraulic system may also include an accumulator configured to selectively receive pressurized fluid from the pump and from the actuator, an electric starter configured to start the engine, and a motor selectively supplied with fluid from the accumulator to assist the electric starter in starting the engine.

19 Claims, 8 Drawing Sheets

Related U.S. Application Data

(60) Provisional application No. 61/946,452, filed on Feb. 28, 2014.

(51) Int. Cl.
| | | |
|---|---|---|
| *E02F 9/20* | (2006.01) | |
| *E02F 9/22* | (2006.01) | |
| *F02N 11/00* | (2006.01) | |
| *B60K 6/12* | (2006.01) | |

(52) U.S. Cl.
CPC .......... *E02F 9/2246* (2013.01); *E02F 9/2289* (2013.01); *E02F 9/2292* (2013.01); *E02F 9/2296* (2013.01); *F02N 11/00* (2013.01); *B60K 2006/126* (2013.01); *F02N 2300/2002* (2013.01); *F15B 2211/212* (2013.01); *F15B 2211/851* (2013.01)

(56) References Cited

U.S. PATENT DOCUMENTS

| | | | |
|---|---|---|---|
| 4,324,275 A | 4/1982 | Ward | |
| 4,959,962 A | 10/1990 | Hagin et al. | |
| 5,542,384 A | 8/1996 | Rosenmann et al. | |
| 6,453,678 B1 | 9/2002 | Sundhar | |
| 6,679,214 B2 | 1/2004 | Kobayashi et al. | |
| 6,705,266 B2 | 3/2004 | Tachikawa et al. | |
| 6,730,000 B1 | 5/2004 | Leising et al. | |
| 6,826,909 B2 | 12/2004 | Walls | |
| 6,935,114 B2 | 8/2005 | Hajek et al. | |
| 7,117,836 B2 | 10/2006 | Foster | |
| 7,558,666 B2 | 7/2009 | Digonis | |
| 7,657,350 B2 | 2/2010 | Moran | |
| 7,900,724 B2 | 3/2011 | Promersberger et al. | |
| 7,913,791 B2 | 3/2011 | Rose et al. | |
| 8,146,559 B2 | 4/2012 | Larson | |
| 8,322,473 B2 | 12/2012 | Hilberer | |
| 8,335,618 B2 | 12/2012 | Knapp et al. | |
| 8,414,456 B2 | 4/2013 | Nedorezov et al. | |
| 2004/0118623 A1 | 6/2004 | Shore et al. | |
| 2005/0140208 A1 | 6/2005 | Ji | |
| 2008/0110166 A1* | 5/2008 | Stephenson | E02F 9/2217 60/414 |
| 2008/0177434 A1 | 7/2008 | Moran | |
| 2008/0190703 A1 | 8/2008 | Kato et al. | |
| 2010/0052331 A1* | 3/2010 | Fonseca | F02N 7/08 290/1 A |
| 2010/0174465 A1 | 7/2010 | Gibson et al. | |
| 2010/0311538 A1 | 12/2010 | Miyabe et al. | |
| 2011/0146261 A1 | 6/2011 | Tevis et al. | |
| 2011/0256981 A1 | 10/2011 | Saito et al. | |
| 2012/0144819 A1 | 6/2012 | Kawashima et al. | |
| 2012/0204548 A1 | 8/2012 | Turnis et al. | |
| 2012/0212046 A1 | 8/2012 | Goto | |
| 2012/0302402 A1 | 11/2012 | Waku et al. | |
| 2013/0004280 A1* | 1/2013 | Zhang | E02F 9/123 414/687 |
| 2014/0208733 A1* | 7/2014 | Krittian | F02N 7/00 60/413 |

FOREIGN PATENT DOCUMENTS

| | | |
|---|---|---|
| GB | 2427442 B | 1/2008 |
| JP | 59-20563 A | 2/1984 |
| JP | 2006037820 A | 2/2006 |
| JP | 2014-145387 A | 8/2014 |
| WO | 2012095993 A1 | 7/2012 |

OTHER PUBLICATIONS

"Hydraulic Motors Series V12, V14, T12". Catalogue HY17-8223/UK, Oct. 2003 [online]. Parker Hannifin, 2003 [retrieved on May 2013]. Retrieved from the Internet: <URL: http://www.parker.com/literature/Literature%20Files/hydraulicpump/cat/english/V12-V14-T12_HY17-8223-UK.pdf>. Pages which cause document to be listed: pp. 5-6, 57-61, 63-67.

"Start-Stop for construction machines", Press Release PI 033/13 [online], Bosch Rexroth AG, Apr. 11, 2013 [retrieved on Feb. 2014]. Retrieved from the Internet: <URL: http://dc-corp.resource.bosch.com/media/xc/company_1/press/product_information/product_information_2013/pi_april_2013/PI_033_13_Start-Stop_en.pdf>.

"SF20-22 Poppet, 2-Way, N.C., High Pressure", Catalog [online]. HydraForce, [available & published online at least as early as Nov. 9, 2007 <URL:https://web.archive.org/web/20120417011751/http://www.hydraforce.com/Solenoid/Sol-pdf/1-047-1.pdf>]. Retrieved from the Internet: <URL: http://www.hydraforce.com/Solenoid/Sol-pdf/1-047-1.pdf>, Pages which cause document to be listed: pp. 1.047.1-1.047.2.

Pollock, Malcolm, Gladstone Ports Corporation Limited—Hybrid Initiatives For Heavy Equipment. Presentation. Gladstone Ports Corporation, Mar. 4, 2011, Symposium on Hybrid Electric Systems for Heavy Machinery, CQUniversity, Mackay, Queensland Australia.

* cited by examiner

MACHINE HAVING HYDRAULIC START ASSIST SYSTEM

RELATED APPLICATIONS

This application is a continuation-in-part of U.S. application Ser. No. 14/263,680, filed Apr. 28, 2014, which is based on and claims priority to U.S. Provisional Application No. 61/946,452 filed on Feb. 28, 2014, the contents of which are expressly incorporated herein by reference.

TECHNICAL FIELD

The present disclosure relates generally to a machine and, more particularly, to a machine having hydraulic start assist system.

BACKGROUND

Hydraulic machines such as excavators, dozers, loaders, backhoes, motor graders, and other types of heavy equipment use one or more hydraulic actuators to accomplish a variety of tasks. These actuators are fluidly connected to an engine-driven pump of the machine that provides pressurized fluid to chambers within the actuators. As the pressurized fluid moves into or through the chambers, the pressure of the fluid acts on hydraulic surfaces of the chambers to affect movement of the actuators and a connected work tool.

One problem associated with this type of hydraulic arrangement involves efficiency. In particular, there may be times when the hydraulic machine is idle and yet still operational. For example, during a truck loading cycle, when an excavator finishes loading a first truck, the excavator must wait for the first truck to depart and a second truck to arrive before additional loading tasks can be completed. And during this time, the engine of the machine may still be turned on (often at high speeds) and needlessly consuming fuel. In these situations, it may be beneficial to selectively turn the engine off to consume fuel.

However, restarting the engine can be harsh on the machine's electrical circuit and cause delays in the work cycle of the machine. Specifically, the electrical circuit could be called on to restart the engine hundreds of times during a particular work shift. In some applications, this overuse of the electrical circuit could cause premature wear and/or failure. In addition, it may take some time for the engine to be turned on and ramp up to required speeds. And this time delay could result in loss productivity and/or become a nuisance for the operator.

An exemplary system for starting and stopping a wheel loader is disclosed in U.S. Pat. No. 8,209,975 that issued to Persson et al. on Jul. 3, 2012 ("the '975 patent"). Specifically, the '975 patent discloses a hydraulic system operable in an energy saving mode during periods of low activity. Examples of such periods include when there is no demand for hydraulic pressure from an implement of the wheel loader, or when an operator of the wheel loader is not providing any control input. When either of these conditions is detected, the system checks to see if enough high pressure fluid has been collected within an accumulator to enable restarting of an engine. When enough high pressure fluid has been collected, the engine is shut down to conserve fuel. If any activity requiring hydraulic pressure (such as input from the operator) is thereafter detected, the energy saving mode is interrupted. This will cause the collected fluid to be directed from the accumulator through a motor that restarts the engine. At the same time, the motor also drives a pump that directs pressurized fluid to the implement so that the operator need not wait for the engine to restart, as fluid pressure from the accumulator is immediately available for controlling and operating the implement. When normal engine operation is resumed, the pump is driven by the engine to begin pressurizing the accumulator with high-pressure fluid.

Although the system of the '975 patent may improve engine restarting through the use of accumulated high-pressure fluid, the system may still be less than optimal. In particular, there may be instances when the engine is shutdown and the accumulator does not contain sufficient fluid to restart the engine. In these instances, the system of the '975 patent may be rendered useless. Further, directing accumulated fluid through the motor to drive the pump and supply fluid to the implement during engine restart may be inefficient. Further, by refilling the accumulator only with fluid from the pump may be wasteful.

The disclosed machine is directed to overcoming one or more of the problems set forth above and/or other problems of the prior art.

SUMMARY

One aspect of the present disclosure is directed to a hydraulic start assist system for a machine having an engine. The hydraulic start assist system may include a work tool, a pump driven by the engine to pressurize fluid, and an actuator configured to receive pressurized fluid from the pump and move the work tool. The hydraulic start assist system may also include an accumulator configured to selectively receive pressurized fluid from the pump and from the actuator, an electric starter configured to start the engine, and a motor selectively supplied with fluid from the accumulator to assist the electric starter in starting the engine.

Another aspect of the present disclosure is directed to a method of operating a machine having an engine. The method may include determining inactivity of a machine operator and determining an ability to hydraulically restart the engine. The method may also include selectively shutting down the engine when the machine operator is inactive and the ability to hydraulically restart the engine exists.

Another aspect of the present disclosure is directed to another machine. This machine may include a frame, an engine mounted to the frame, a boom, a swing motor configured to swing the boom relative to the frame, and a boom cylinder configured to raise and lower the boom relative to the frame. The machine may also include a pump driven by the engine to supply pressurized fluid to the swing motor and to the boom cylinder, a first accumulator configured to receive pressurized fluid from the pump and from the swing motor, and a second accumulator configured to receive pressurized fluid from the pump and from the boom cylinder. The machine may further include an electric starter configured to start the engine, a hydraulic motor configured to start the engine, and a controller. The controller may be configured to determine an activity level of a machine operator, determine a status of the first and second accumulators, and selectively shutdown the engine when the machine operator is inactive and the first and second accumulators have a capacity to drive the hydraulic motor to start the engine alone. The controller may be further configured to selectively restart the engine using the electric starter alone, the hydraulic motor alone, or the electric starter and the hydraulic motor together when the machine operator becomes active after engine shutdown and based on the capacity of the first and second accumulators.

DETAILED DESCRIPTION

Figure 1:
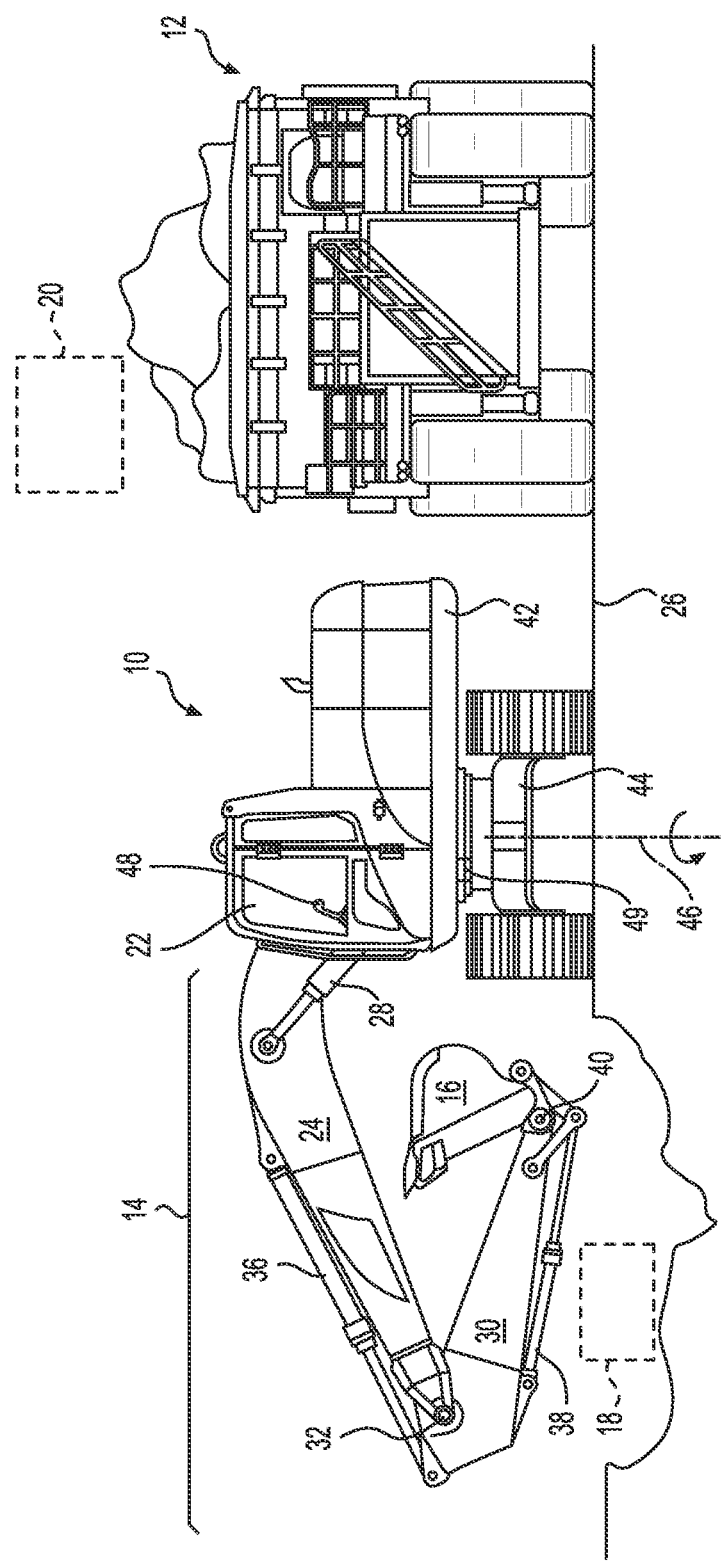
FIG. 1 is an isometric illustration of an exemplary disclosed machine.

FIG. 1 illustrates an exemplary machine 10 having multiple systems and components that cooperate to excavate, carry, scoop, or otherwise move material, and, in one example, load material onto a nearby haul vehicle 12 (or another dump/unload location of material). In the depicted example, machine 10 is a hydraulic excavator. It is contemplated, however, that machine 10 could alternatively embody another excavation, loading, or material handling machine, such as a wheel loader, a backhoe, a front shovel, a dragline excavator, a crane, or another similar machine. Machine 10 may include, among other things, an hydraulic system 14 configured to move a work tool 16, such as, in the depicted example, between a dig location 18 within a trench or at a pile, and a dump location 20, for example over haul vehicle 12. Machine 10 may also include an operator station 22 for manual control of hydraulic system 14. It is contemplated that machine 10 may perform operations other than truck loading, if desired, such as craning, trenching, material transport and/or removal, and material handling.

Hydraulic system 14 may include a linkage structure acted on by fluid actuators to move work tool 16. Specifically, hydraulic system 14 may include a boom 24 that is vertically pivotal relative to a work surface 26 by a pair of adjacent, double-acting, hydraulic cylinders 28 (only one shown in FIG. 1). Hydraulic system 14 may also include a stick 30 that is vertically pivotal about a horizontal pivot axis 32 relative to boom 24 by a single, double-acting, hydraulic cylinder 36. Hydraulic system 14 may further include a single, double-acting, hydraulic cylinder 38 that is operatively connected to work tool 16 to tilt work tool 16 vertically about a horizontal pivot axis 40 relative to stick 30. Boom 24 may be pivotally connected to a frame 42 of machine 10, while frame 42 may be pivotally connected to an undercarriage member 44 and swung about a vertical axis 46 by one or more swing motors 49. Stick 30 may pivotally connect work tool 16 to boom 24 by way of pivot axes 32 and 40. It is contemplated that a greater or lesser number of fluid actuators may be included within hydraulic system 14 and connected in a manner other than described above, if desired.

Numerous different work tools 16 may be attachable to a single machine 10 and controllable via operator station 22. Work tool 16 may include any device used to perform a particular task such as, for example, a bucket, a fork arrangement, a blade, a shovel, a crusher, a shear, a grapple, a grapple bucket, a magnet, or any other task-performing device known in the art. Although connected in the embodiment of FIG. 1 to lift, swing, and tilt relative to machine 10, work tool 16 may alternatively or additionally rotate, slide, extend, open and close, or move in another manner known in the art.

Operator station 22 may be configured to receive input from a machine operator indicative of a desired work tool movement. Specifically, operator station 22 may include one or more input devices 48 embodied, for example, as single or multi-axis joysticks located proximal an operator seat (not shown). Input devices 48 may be proportional-type controllers configured to position and/or orient work tool 16 by producing a work tool position signal that is indicative of a desired work tool speed and/or force in a particular direction. The position signal may be used to actuate any one or more of hydraulic cylinders 28, 36, 38 and/or swing motor(s) 49. It is contemplated that different or additional input devices 48 may alternatively or additionally be included within operator station 22 and configured to control the movement and/or operation of the machine 10 and the systems thereof, such as, for example, wheels, knobs, push-pull devices, switches, pedals, and other operator input devices known in the art.

Figure 2:
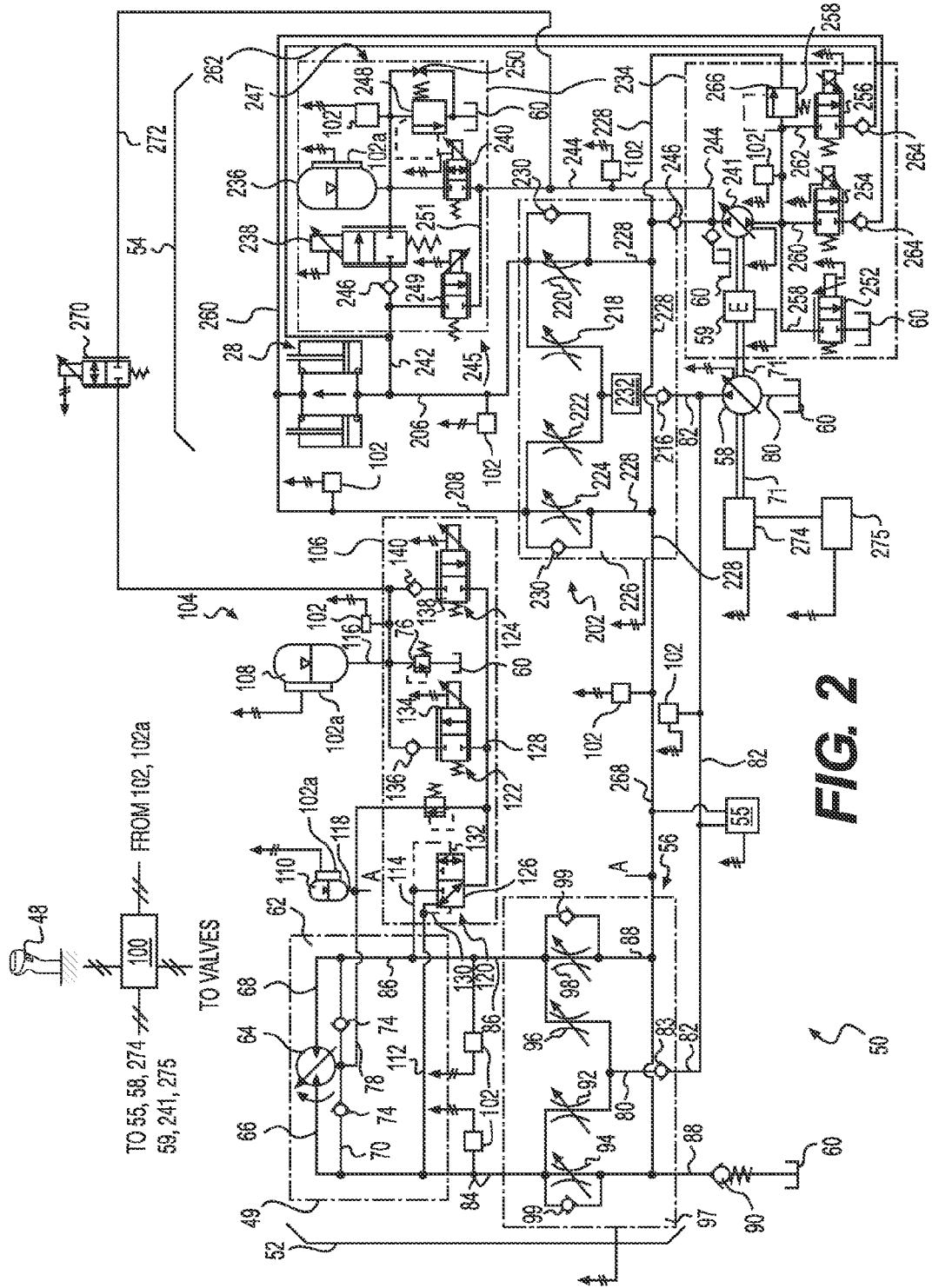
FIG. 2 is a schematic illustration of an exemplary disclosed hydraulic system that may be used in conjunction with the machine of FIG. 1.

As illustrated in FIG. 2, machine 10 may include a hydraulic circuit 50 having a plurality of fluid components that cooperate to move hydraulic system 14 (referring to FIG. 1). In particular, hydraulic circuit 50 may include a swing circuit 52 associated with swing motor 49, a boom circuit 54 associated with hydraulic cylinders 28, and at least one other circuit 55 associated with hydraulic cylinders 36 and 38.

Swing circuit 52 may include, among other things, a swing control valve 56 connected to regulate a flow of pressurized fluid from a pump 58 to swing motor(s) 49 and from swing motor(s) 49 to a low-pressure tank 60. This fluid regulation may function to cause a swinging movement of work tool 16 about axis 46 (referring to FIG. 1) in accordance with an operator request received via input device 48. It should be noted that, while only a single swing motor 49 is shown in FIG. 2, any number of parallel swing motors 49 may be utilized.

Each swing motor 49 may include a housing 62 at least partially forming a first and a second chamber located to either side of an impeller 64. When the first chamber is connected to an output of pump 58 (e.g., via a first chamber passage 66 formed within housing 62) and the second chamber is connected to tank 60 (e.g., via a second chamber passage 68 formed within housing 62), impeller 64 may be driven to rotate in a first direction (shown in FIG. 2). Conversely, when the first chamber is connected to tank 60 via first chamber passage 66 and the second chamber is connected to pump 58 via second chamber passage 68, impeller 64 may be driven to rotate in an opposite direction. The flow rate of fluid through impeller 64 may relate to a rotational speed of swing motor 49, while a pressure differential across impeller 64 may relate to an output torque thereof.

Swing motor 49 may include built-in makeup functionality. In particular, a makeup passage 70 may be formed within housing 62, between first chamber passage 66 and second chamber passage 68, and a pair of opposing check valves 74 may be disposed within makeup passage 70. A low-pressure passage 78 may be connected to makeup passage 70 at a location between check valves 74. Based on a pressure differential between low-pressure passage 78 and first and second chamber passages 66, 68, one of check valves 74 may open to allow fluid from low-pressure passage 78 into the lower-pressure one of the first and second chambers. A significant pressure differential may generally exist between the first and second chambers during a swinging movement of hydraulic system 14.

Pump 58 may be driven by an engine 59 of machine 10 to draw fluid from tank 60 via an inlet passage 80, pressurize the fluid to a desired level, and discharge the fluid into swing circuit 52 via a common discharge or supply passage 82. A check valve 83 may be disposed within discharge passage 82, if desired, to provide for a unidirectional flow of pressurized fluid from pump 58 into swing circuit 52. Pump 58 may embody, for example, a variable displacement pump (shown in FIG. 2), a fixed displacement pump, or another source known in the art. Pump 58 may be drivably connected to engine 59 or to another power source of machine 10 by, for example, a countershaft 71, a belt, or in another suitable manner. Alternatively, pump 58 may be indirectly connected to engine 59 of machine 10 via a torque converter, a reduction gear box, an electrical circuit, or in any other suitable manner. In one embodiment, engine 59 may be an internal combustion engine such as a diesel engine, a gasoline engine, a natural gas engine or any other type of engine known in the art which can produce energy from the combustion of any known combustible medium. Pump 58 may produce a stream of pressurized fluid having a pressure level and/or a flow rate determined, at least in part, by demands of the actuator(s) within swing circuit 52 that correspond with operator requested movements. Discharge passage 82 may be connected within swing circuit 52 to first and second chamber passages 66, 68 via swing control valve 56 and first and second chamber conduits 84, 86, respectively, which extend between swing control valve 56 and swing motor 49.

Tank 60 may constitute a reservoir configured to hold a low-pressure supply of fluid. The fluid may include, for example, a dedicated hydraulic oil, an engine lubrication oil, a transmission lubrication oil, or any other fluid known in the art. One or more hydraulic circuits within machine 10 may draw fluid from and return fluid to tank 60. It is contemplated that hydraulic circuit 50 may be connected to multiple separate fluid tanks (shown in FIG. 2) or to a single tank, as desired. Tank 60 may be fluidly connected to swing control valve 56 via a return passage 88, and to first and second chamber passages 66, 68 via swing control valve 56 and first and second chamber conduits 84, 86, respectively. One or more check valves 90 may be disposed within return passage 88, if desired, to promote a unidirectional flow of fluid into tank 60 and/or to maintain a desired return flow pressure.

Swing control valve 56 may have elements that are movable to control the rotation of swing motor 49 and corresponding swinging motion of hydraulic system 14. Specifically, swing control valve 56 may include a first chamber supply element 92, a first chamber drain element 94, a second chamber supply element 96, and a second chamber drain element 98 all disposed within a common block or housing 97. The first and second chamber supply elements 92, 96 may be connected in parallel to discharge passage 82 to regulate filling of their respective chambers with fluid from pump 58, while the first and second chamber drain elements 94, 98 may be connected in parallel to return passage 88 to regulate draining of the respective chambers of fluid. A makeup valve 99, for example a check valve, may be disposed between discharge passage 82 and an outlet of first chamber drain element 94 and between discharge passage 82 and an outlet of second chamber drain element 98.

To drive swing motor 49 to rotate in the first direction, first chamber supply element 92 may be shifted to allow pressurized fluid from pump 58 to enter the first chamber of swing motor 49 via discharge passage 82 and first chamber conduit 84, while second chamber drain element 98 may be shifted to allow fluid from the second chamber of swing motor 49 to drain to tank 60 via second chamber conduit 86 and return passage 88. To drive swing motor 49 to rotate in the opposite direction, second chamber supply element 96 may be shifted to communicate the second chamber of swing motor 49 with pressurized fluid from pump 58, while first chamber drain element 94 may be shifted to allow draining of fluid from the first chamber of swing motor 49 to tank 60. It is contemplated that both the supply and drain functions of swing control valve 56 (i.e., of the four different supply and drain elements) may alternatively be performed by a single valve element associated with the first chamber and a single valve element associated with the second chamber, or by a single valve element associated with both the first and second chambers, if desired.

Supply and drain elements 92-98 of swing control valve 56 may be solenoid-movable against a spring bias in response to a flow rate and/or position command issued by a controller 100. In particular, swing motor 49 may rotate at a velocity that corresponds with the flow rate of fluid into and out of the first and second chambers. Accordingly, to achieve an operator-desired swing speed, a command based on an assumed or measured pressure drop may be sent to the solenoids (not shown) of supply and drain elements 92-98 that causes them to open an amount corresponding to the necessary rate of fluid flow into and out of swing motor 49. This command may be in the form of a flow rate command or a valve element position command that is issued by controller 100. It is contemplated that one or more of valves 92-98 could alternatively be pilot operated and/or pilot assisted, if desired.

Swing circuit 52 may be fitted with an energy recovery module (ERM) 104 that is configured to selectively extract and recover energy from waste fluid that is discharged by swing motor 49. ERM 104 may include, among other things, a recovery valve block (RVB) 106 that is fluidly connectable to swing motor 49, a swing accumulator 108 configured to selectively communicate with swing motor 49 via RVB 106, and a makeup accumulator 110 also configured to selectively and directly communicate with swing motor 49. In the disclosed embodiment, RVB 106 may be fixedly and mechanically connectable to one or both of swing control valve 56 and swing motor 49, for example directly to housing 62 and/or directly to housing 97. RVB 106 may include an internal first passage 112 fluidly connectable to first chamber conduit 84, and an internal second passage 114 fluidly connectable to second chamber conduit 86. Swing accumulator 108 may be fluidly connected to RVB 106 via a conduit 116, while makeup accumulator 110 may be fluidly connectable to low-pressure passage 78 in parallel with tank 60 (see connection A), via a conduit 118.

RVB 106 may house a selector valve 120, a charge valve 122 associated with swing accumulator 108, a discharge valve 124 associated with swing accumulator 108 and disposed in parallel with charge valve 122, and a relief valve 76. Selector valve 120 may automatically fluidly communicate one of first and second passages 112, 114 with charge and discharge valves 122, 124 based on a pressure of first and second passages 112, 114. Charge and discharge valves 122, 124 may be selectively movable in response to commands from controller 100 to fluidly communicate swing accumulator 108 with selector valve 120 for fluid charging or discharging purposes. Relief valve 76 may be selectively connected to an outlet of swing accumulator 108 and/or a downstream side of charge valve 122 with tank 60 to relieve pressures of hydraulic circuit 50.

Selector valve 120 may be a pilot-operated, 2-position, 3-way valve that is automatically movable in response to fluid pressures in first and second passages 112, 114 (i.e., in response to a fluid pressures within the first and second chambers of swing motor 49). In particular, selector valve 120 may include a valve element 126 that is movable from a first position (shown connected in FIG. 2) at which first passage 112 is fluidly connected to charge and discharge valves 122, 124 via an internal passage 128, toward a second position at which second passage 114 is fluidly connected to charge and discharge valves 122, 124 via passage 128. When first passage 112 is fluidly connected to charge and discharge valves 122, 124 via passage 128, fluid flow through second passage 114 may be inhibited by selector valve 120, and vice versa. First and second pilot passages 130, 132 may communicate fluid from first and second passages 112, 114 to opposing ends of valve element 126 such that a higher-pressure one of first or second passages 112, 114 may cause valve element 126 to move and fluidly connect the corresponding passage with charge and discharge valves 122, 124 via passage 128.

Charge valve 122 may be a solenoid-operated, variable position, 2-way valve that is movable in response to a command from controller 100 to allow fluid from passage 128 to enter swing accumulator 108. In particular, charge valve 122 may include a valve element 134 that is movable from a first position (shown connected in FIG. 2) at which fluid flow from passage 128 into swing accumulator 108 is inhibited, toward a second position at which passage 128 is fluidly connected to swing accumulator 108. When valve element 134 is away from the first position (i.e., in the second position or in an intermediate position between the first and second positions) and a fluid pressure within passage 128 exceeds a fluid pressure within swing accumulator 108, fluid from passage 128 may fill (i.e., charge) swing accumulator 108. Valve element 134 may be spring-biased toward the first position and movable in response to a command from controller 100 to any position between the first and second positions to thereby vary a flow rate of fluid from passage 128 into swing accumulator 108. A check valve 136 may be disposed between charge valve 122 and swing accumulator 108 to provide for a unidirectional flow of fluid into swing accumulator 108 via charge valve 122.

Discharge valve 124 may be substantially identical to charge valve 122 in composition, and selectively movable in response to a command from controller 100 to allow fluid from swing accumulator 108 to enter passage 128 (i.e., to discharge). In particular, discharge valve 124 may include a valve element 138 that is movable from a first position (shown connected in FIG. 2) at which fluid flow from swing accumulator 108 into passage 128 is inhibited, toward a second position at which swing accumulator 108 is fluidly connected to passage 128. When valve element 138 is away from the first position (i.e., in the second position or in an intermediate position between the first and second positions) and a fluid pressure within swing accumulator 108 exceeds a fluid pressure within passage 128, fluid from swing accumulator 108 may flow into passage 128. Valve element 138 may be spring-biased toward the first position and movable in response to a command from controller 100 to any position between the first and second positions to thereby vary a flow rate of fluid from swing accumulator 108 into passage 128. A check valve 140 may be disposed between swing accumulator 108 and discharge valve 124 to provide for a unidirectional flow of fluid from swing accumulator 108 into passage 128 via discharge valve 124.

A sensor 102 may be associated with swing accumulator 108 and configured to generate signals indicative of a pressure of fluid within swing accumulator 108, if desired. In one embodiment, sensor 102 may additionally be configured to generate signals indicative of flow rate of fluid flowing into and out of swing accumulator 108. In the disclosed embodiment, sensor 102 may be disposed between swing accumulator 108 and discharge valve 124. It is contemplated, however, that sensor 102 may alternatively be disposed between swing accumulator 108 and charge valve 122 or directly connected to swing accumulator 108, if desired. Signals from sensor 102 may be directed to controller 100 for use in regulating operation, in part, of charge and/or discharge valves 122, 124, as well as valve 270, as further discussed herein. Additionally, or alternatively, each accumulator, including swing accumulator 108, makeup accumulator 110, boom accumulator 236, and accumulator 402 (as further discussed herein) may include an accumulator state of charge sensor 102a. Each state of charge sensor 102a may be directly connected to one of each of the foregoing accumulators 108, 110, 236, and 402 or otherwise operatively and sensingly associated therewith to generate signals indicative of the presently available (or unavailable, as the case may be) hydraulic charge energy within, or the state of charge, of each accumulator 108, 110, 236, and 402. In particular, each state of charge sensor 102a may be configured to sense and/or generate signals indicative of the state of charge, which may be a measure and/or indicator of the available dynamic, pressurized, thermal, and/or volumetric fluid charge energy of and within each accumulator 108, 110, 236, and 402, wherein the state of charge may be based upon and/or determined from signals indicative of any one or more of the pressures, temperatures, and volumes of fluid within each associated accumulator 108, 110, 236, and 402, as well as the flow rates of the fluid entering each accumulator 108, 110, 236, and 402, sensed and/or generated by the state of charge sensors 102a. In one embodiment, in addition to any one or more of the foregoing signals, the state of charge of each accumulator 108, 110, 236, and 402 may additionally be based upon and/or determined from, and each state of charge sensor 102a may be operably connected and configured to sense and/or generate, signals indicative of one or more of the compression rate and volume of the compressed gas within each associated accumulator 108, 110, 236, and 402 (or alternatively, in embodiments wherein one or more of 108, 110, 236, and 402 embody membrane/spring-biased or bladder types, compression rate and/or volume of the associated membrane, springs, or bladders thereof), which also may be indicative of the state of charge. Signals from each state of charge sensor 102a may be directed to controller 100 for use in regulating operation of charge and/or discharge valves, including, in part, valves 122, 124, and 270, as further discussed herein. Although in some embodiments each state of charge sensor 102a associated with swing accumulator 108, makeup accumulator 110, boom accumulator 236, and accumulator 402 may be used as a substitute for each sensor 102 associated with the foregoing accumulators 108, 110, 236, and 402, it should be understood that in other embodiments each sensor 102, and the pressure and flow signals therefrom may be utilized in conjunction with and to supplement each state of charge sensor 102a as well as the signals indicative of the state of charge of swing accumulator 108, makeup accumulator 110, boom accumulator 236, and accumulator 402.

Swing and makeup accumulators 108, 110 may each embody pressure vessels filled with a compressible gas that are configured to store pressurized fluid for future use by swing motor 49. The compressible gas may include, for example, nitrogen, argon, helium, or another appropriate compressible gas. As fluid in communication with swing and makeup accumulators 108, 110 exceeds pressures of accumulators 108, 110, the fluid may flow into accumulators 108, 110. Because the gas therein is compressible, it may act like a spring and compress as the fluid flows into swing and makeup accumulators 108, 110. When the pressure of the fluid within conduits 116, 118 drops below the pressures of swing and makeup accumulators 108, 110, the compressed gas may expand and urge the fluid from within swing and makeup accumulators 108, 110 to exit. It is contemplated that swing and makeup accumulators 108, 110 may alternatively embody membrane/spring-biased or bladder types of accumulators, if desired.

In the disclosed embodiment, swing accumulator 108 may be a larger (i.e., about 5-20 times larger) and higher-pressure (i.e., about 5-60 times higher-pressure) accumulator, as compared to makeup accumulator 110. Specifically, swing accumulator 108 may be configured to accumulate fluid having a pressure in a range of about 300 bar, while makeup accumulator 110 may be configured to accumulate about 20-25% as much fluid as swing accumulator 108 having a pressure in a range of about 5-30 bar. In this configuration, swing accumulator 108 may be used primarily to assist the motion of swing motor 49 and to improve machine efficiencies, while makeup accumulator 110 may be used primarily as a makeup accumulator to help reduce a likelihood of voiding at swing motor 49. It is contemplated, however, that other volumes and/or pressures may be accommodated by swing and makeup accumulators 108, 110, if desired.

Controller 100 may be connected in electronic controllable and/or sensing communication (via wired or wireless electronic connections) with various components of the machine 10 and the hydraulic circuit 50 thereof to monitor, regulate, and/or effectuate control and operation of the machine 10 as well as the systems thereof, as provided above and further discussed herein. In particular, in addition to the components of hydraulic system 50 identified in association with the schematic illustration of controller 100 as shown in FIGS. 2-5 and FIG. 8, the wired or wireless electronic connections between controller 100 and the identified and/or additional components of hydraulic system 50 as discussed in any one or more of the disclosed embodiments herein are illustrated as double hashed lines with arrows extending generally toward controller 100 as shown in FIGS. 2-5 and FIG. 8. Controller 100 may be configured to selectively cause swing accumulator 108 to charge and discharge, thereby improving performance of machine 10. In particular, a typical swinging motion of hydraulic system 14 instituted by swing motor 49 may consist of segments of time during which swing motor 49 is accelerating a swinging movement of hydraulic system 14, and segments of time during which swing motor 49 is decelerating the swinging movement of hydraulic system 14. The acceleration segments may require significant energy from swing motor 49 that is conventionally realized by way of pressurized fluid supplied to swing motor 49 by pump 58, while the deceleration segments may produce significant energy in the form of pressurized fluid that is conventionally wasted through discharge to tank 60. Both the acceleration and deceleration segments may require swing motor 49 to convert significant amounts of hydraulic energy to swing kinetic energy, and vice versa. The pressurized fluid passing through swing motor 49 during deceleration, however, still contains a large amount of energy. If the fluid passing through swing motor 49 is selectively collected within swing accumulator 108 during the deceleration segments, this energy can then be returned to (i.e., discharged) and reused by swing motor 49 during the ensuing acceleration segments. In one example, the fluid passing through swing motor 49 can be selectively collected within swing accumulator 108 during the deceleration segments in response to a command from controller 100 to charge valve 122 to be actuated or moved to its second position (or an intermediate position) to allow fluid from passage 128 to enter swing accumulator 108 (from swing motor 49 via the appropriate one of first and second chamber conduits 84, 86 and first and second passages 112, 116, respectively, and selector valve 120 to passage 128). Additionally, this energy can then be returned to (i.e., discharged) and reused by swing motor 49 during the ensuing acceleration segments in response to a command from controller 100 to discharge valve 124 to be actuated or moved to its second position (or an intermediate position) to allow fluid from swing accumulator 108 to enter passage 128 (i.e., to discharge) and subsequently be directed to swing motor 49 as discussed herein. In particular, swing motor 49 can be assisted during the acceleration segments by selectively causing swing accumulator 108 to discharge pressurized fluid into the higher-pressure chamber of swing motor 49 (via discharge valve 124 (as well as, in one example, in response to a command from controller 100 to discharge valve 124 to be actuated to its second position (or an intermediate position) as discussed above), passage 128, selector valve 120, and the appropriate one of first and second chamber conduits 84, 86), alone or together with high-pressure fluid from pump 58, thereby propelling swing motor 49 at the same or greater rate with less pump power than otherwise possible via pump 58 alone. Swing motor 49 can be assisted during the deceleration segments by selectively causing swing accumulator 108 to charge with fluid exiting swing motor 49 (which in one example, can be effectuated, in part, via the charge valve 122 in response to receiving a command from controller 100 to be actuated to its second position (or an intermediate position) to allow fluid from passage 128 to enter swing accumulator 108 as discussed above), thereby providing additional resistance to the motion of swing motor 49 and lowering a restriction and associated cooling requirement of the fluid exiting swing motor 49.

Controller 100 may be in communication with the different components of swing circuit 52 to regulate operations of machine 10. For example, controller 100 may be in communication with the elements of swing control valve 56 in swing circuit 52. Based on various operator input and monitored parameters, as will be described in more detail below, controller 100 may be configured to selectively activate swing control valve 56 in a coordinated manner to efficiently carry out operator requested movements of hydraulic system 14.

Controller 100 may include a memory, a secondary storage device, a clock, and one or more processors that cooperate to accomplish a task consistent with the present disclosure. Numerous commercially available microprocessors can be configured to perform the functions of controller 100. It should be appreciated that controller 100 could readily embody a general machine controller capable of controlling numerous other functions of machine 10. Various known circuits may be associated with controller 100, including signal-conditioning circuitry, communication circuitry, and other appropriate circuitry. It should also be appreciated that controller 100 may include one or more of an application-specific integrated circuit (ASIC), a field-programmable gate array (FPGA), a computer system, and a logic circuit configured to allow controller 100 to function in accordance with the present disclosure. It should also be understood that controller 100 of any of the embodiments as discussed herein may be embodied as a single controller or alternatively may be embodied as and include multiple controllers and/or control modules, such as, for instance, one or more master controllers/control modules and one or more local controllers/control modules, connected in electronic communication and configured to exchange, receive, transmit, monitor, generate, and/or process a plurality of sensed signals, information, and/or commands to monitor, regulate, and/or effectuate control and operation of the machine 10 as well as the systems thereof, as provided above and further discussed herein.

The operational parameters monitored by controller 100, in one embodiment, may include, in part, a pressure, and additionally, in one or more embodiments, a flow rate of fluid within swing and/or boom circuits 52, 54. For example, one or more sensors 102 may be strategically located within first chamber and/or second chamber conduits 84, 86 to sense a pressure of, and additionally, in one or more embodiments, a flow rate of fluid through, the respective passages and generate a corresponding signal or signals indicative of the sensed pressure and additionally, in one or more embodiments, the sensed flow rate directed to controller 100. It is contemplated that any number of sensors 102 may be placed in any location within swing and/or boom circuits 52, 54, as desired. It is further contemplated that other operational parameters such as, for example, speeds, temperatures, viscosities, densities, etc. may also or alternatively be monitored and used to regulate operation of hydraulic circuit 50, if desired. As provided above and further provided herein, controller 100 may determine and/or identify the current condition and motion of the hydraulic system 14 of the machine 10 based on one or more of a plurality of signals to responsively effectuate control and operation of the swing circuit 50. In one embodiment, controller 100 may determine and/or identify that the swing motor 49 is accelerating or decelerating the swinging movement of hydraulic system 14 (as well as the boom 24, stick 30, work tool 16, and frame 42 of the machine 10 about axis 46) (and may identify and/or determine the segments of time associated with the accelerating and decelerating movements) in response to corresponding signals from input device 48 indicative of operator-requested swinging movements of the hydraulic system 14. In particular, controller 100 may determine the acceleration and deceleration (as well as the acceleration and deceleration time segments) of the hydraulic system 14 based upon and/or in proportion with the operator's actuation of the input device 48 in a manner to request a swinging movement, and, in response, may selectively generate the appropriate respective commands to the discharge valve 124 and the charge valve 122 to effectuate assisting swing motor 49 during the acceleration segments, by causing swing accumulator 108 to discharge pressurized fluid into the higher-pressure chamber of swing motor 49, and during the deceleration segments, by causing swing accumulator 108 to charge with fluid exiting swing motor 49 for collection and re-use by swing motor 49 during an ensuing acceleration segment, respectively, consistent with the foregoing disclosure above. In an additional or alternative embodiment, controller 100 may monitor, receive and process, in part, any one or more or any combination of signals associated with the hydraulic circuit 50 in addition to signals from input device 48 indicative of operator-requested swinging movements as discussed above. In particular, controller 100 may monitor, receive and process, in part, any one or more or any combination of signals from sensor 102 connected to sense the pressures and flow rates within the first chamber conduit 84, signals from sensor 102 connected to sense the pressures and flow rates within the second chamber conduit 86, signals received from input device 48 indicative of an operator's actuation of the same as an operator-requested swinging movement of work tool 16 about axis 46, and signals from sensor 102 and/or state of charge sensor 102a indicative of a pressure and flow rate, and/or a state of charge, respectively, of fluid within swing accumulator 108, as discussed above. In response to the monitoring, receiving and processing, in part, of any one or more of the foregoing signals, controller 100 may be configured to interactively and responsively determine and/or identify the current condition and motion of the hydraulic system 14 of the machine 10. In particular, in response to, in part, any one or more or any combination of signals from sensors 102 indicative of pressures and flow rates, and pressure and flow rate changes within and between, the first chamber conduit 84 and the second chamber conduit 86, signals indicative of pressures of fluid within swing accumulator 108 and/or the state of charge thereof (from charge sensor 102a), as well as, in one example, signals received from input device 48 indicative of an operator's actuation of the input device 48 and requested motion of hydraulic system 14, the controller 100 may determine and/or identify that the swing motor 49 is accelerating the swinging movement of hydraulic system 14 (as well as the boom 24, stick 30, work tool 16, and frame 42 of the machine 10 about axis 46) or that the swing motor 49 is decelerating a swinging movement of the of hydraulic system 14, and may identify and/or determine the segments of time associated with the accelerating and decelerating movements. In response to the foregoing signals indicative of the motion of the hydraulic system 10 as well as the amount of pressure and/or charge within swing accumulator 108, controller 100 may be configured to responsively generate the appropriate respective commands to the discharge valve 124 and the charge valve 122 to effectuate assisting swing motor 49 during the acceleration segments, by causing swing accumulator 108 to discharge pressurized fluid into the higher-pressure chamber of swing motor 49, and during the deceleration segments, by causing swing accumulator 108 to charge with fluid exiting swing motor 49 for collection and re-use by swing motor 49 during an ensuing acceleration segment, respectively, consistent with the foregoing disclosure above. Upon review of and with the benefit of the teachings of the present disclosure, and based thereupon, those of ordinary skill in the art will appreciate that to facilitate charging of the swing accumulator 108 (and/or makeup accumulator 110) and/or assistance of swing motor 49 during deceleration time segments of hydraulic system 14 as discussed above, it may be necessary to restrict the outlet flow of the appropriate one of first chamber drain element 94 or second chamber drain element 98 of swing control valve 56, such that the pressurized fluid from swing motor 49 may be directed into the swing accumulator 108 (and/or makeup accumulator 110).

Boom circuit 54 may include, among other things, a boom control valve 202 modulated by controller 100 to regulate a flow of pressurized fluid from pump 58 to hydraulic cylinders 28 and from hydraulic cylinders 28 to tank 60. This fluid regulation may function to cause a lifting or lowering movement of work tool 16 about the associated horizontal axis (referring to FIG. 1) in accordance with an operator request received via input device 48.

Hydraulic cylinders 28 may each embody a linear actuator having a tubular housing and a piston assembly arranged to form two separated pressure chambers (e.g., a head chamber and a rod chamber) within the housing. The pressure chambers may be selectively supplied with pressurized fluid and drained of the pressurized fluid to cause the piston assembly to displace within the tubular housing, thereby changing an effective length of hydraulic cylinders 28. The flow rate of fluid into and out of the pressure chambers may relate to a velocity of hydraulic cylinders 28, while a pressure differential between the two pressure chambers may relate to a force imparted by hydraulic cylinders 28 on the associated linkage members. The expansion and retraction of hydraulic cylinders 28 may function to lift and lower work tool 16 relative to work surface 26.

Boom control valve 202 may be connected to hydraulic cylinders 28 by way of a head-end passage 206 and a rod-end passage 208. Based on an operating position of boom control valve 202, one of head- and rod-end passages 206, 208 may be connected to pump 58 via boom control valve 202, while the other of head- and rod-end passages 206, 208 may be simultaneously connected to tank 60 via boom control valve 202, thereby creating the pressure differential across the piston assembly within hydraulic cylinders 28 that causes extension or retraction thereof. A significant pressure differential may generally exist between the head and rod chambers during a lifting or lower movement of work tool 16, particularly during a lowering movement when work tool 16 is heavily loaded. That is, during the lowering movement, head-end passage 206 may carry fluid having a much higher pressure than fluid carried within rod-end passage 208 at that same time.

Pump 58 may produce a stream of pressurized fluid having a pressure level and/or a flow rate determined, at least in part, by demands of the actuators within boom circuit 54 that correspond with operator requested movements. A check valve 216 may be disposed within discharge passage 82, between pump 58 and boom control valve 202, if desired, to provide for a unidirectional flow of pressurized fluid from pump 58 into boom circuit 54. Discharge passage 82 may be connected within boom circuit 54 to head- and rod-end passages 206, 208 via boom control valve 202.

Boom control valve 202, in the disclosed exemplary embodiment, may be substantially identical to swing control valve 56. In particular, boom control valve 202 may have elements that are movable to control the extension and retraction of hydraulic cylinders 28 and corresponding lifting and lowering motions of hydraulic system 14. Specifically, boom control valve 202 may include a head-end supply element 218, a head-end drain element 220, a rod-end supply element 222, and a rod-end drain element 224 all disposed within a common block or housing 226. Head- and rod-end supply elements 218, 222 may be connected in parallel to discharge passage 82 to regulate filling of their respective chambers with fluid from pump 58, while head- and rod-end drain elements 220, 224 may be connected in parallel to a return passage 228 to regulate draining of the respective chambers of fluid to tank 60. A makeup valve 230, for example a check valve, may be disposed between return passage 228 and an outlet of head-end drain element 220 and between return passage 228 and an outlet of rod-end drain element 224.

To extend hydraulic cylinders 28, head-end supply element 218 may be shifted to allow pressurized fluid from pump 58 to enter the head chamber of hydraulic cylinders 28 via discharge passage 82 and head-end passage 206, while rod-end drain element 224 may be shifted to allow fluid from the rod chamber to drain into tank 60 via rod-end passage 208 and return passage 228. To retract hydraulic cylinders 28, rod-end supply element 222 may be shifted to communicate the rod chamber with pressurized fluid from pump 58, while head-end drain element 220 may be shifted to allow draining of fluid from the head chamber into tank 60. It is contemplated that both the supply and drain functions of boom control valve 202 (i.e., of the four different supply and drain elements) may alternatively be performed by a single valve element associated with the head chamber and a single valve element associated with the rod chamber, or by a single valve element associated with both the head and rod chambers, if desired.

Supply and drain elements 218-224 of boom control valve 202 may be solenoid-movable against a spring bias in response to a flow rate and/or position command issued by a controller 100. In particular, hydraulic cylinders 28 may extend and retract at velocities that correspond with the flow rates of fluid into and out of the head and rod chambers. Accordingly, to achieve an operator-desired lift speed, a command based on an assumed or measured pressure drop may be sent to the solenoids (not shown) of supply and drain elements 218-224 that causes them to open an amount corresponding to the necessary fluid flow rates at hydraulic cylinders 28. This command may be in the form of a flow rate command or a valve element position command that is issued by controller 100. It is contemplated that one or more of valves 218-224 could alternatively be pilot operated and/or pilot assisted, if desired.

In some embodiments, a pressure compensator 232 may be included within boom circuit 54 and associated with boom control valve 202. In the disclosed example, pressure compensator 232 is disposed within discharge passage 82 at a location upstream of boom control valve 202. In this location, pressure compensator 232 may be configured to supply a substantially constant flow rate of fluid to boom control valve 202 during fluctuations in supply pressure caused by interaction of boom circuit 54 with swing circuit 52 and/or circuit 55.

Like swing circuit 52, boom circuit 54 may also be fitted with an energy recovery module (ERM) 234 that is configured to selectively extract and recover energy from waste fluid that is discharged by hydraulic cylinders 28. ERM 234 may include, among other things, a boom accumulator 236 configured to selectively communicate with hydraulic cylinders 28 via a first charge valve 238 and a second charge valve 240, and a motor 241 selectively driven by the accumulated fluid. A passage 242 may extend from head-end passage 206 through charge valve 238 to boom accumulator 236, and a passage 244 may extend from return passage 228 through charge valve 240 to boom accumulator 236 (and between accumulator 236 and an inlet of motor 241). One or more check valves 246 may be disposed within passages 242 and/or 244 to promote unidirectional fluid flows into boom accumulator 236 and or out of return passage 228, respectively. First and second charge valves 238, 240 may be selectively movable in response to commands from controller 100 to fluidly communicate head-end passage 206 and/or return passage 228 with boom accumulator 236 for fluid charging purposes. Similarly, second charge valve 240 may be selectively movable to fluidly communicate boom accumulator 236 with the inlet of motor 241 for discharging purposes.

Boom accumulator 236 of boom circuit 54 may be similar to swing and makeup accumulators 108, 110 of swing circuit 52. In particular, boom accumulator 236 may embody a pressure vessel filled with a compressible gas that is configured to store pressurized fluid for future use by hydraulic cylinders 28. The compressible gas may include, for example, nitrogen, argon, helium, or another appropriate compressible gas. As fluid in communication with boom accumulator 236 exceeds a pressure of boom accumulator 236, the fluid may flow into boom accumulator 236. Because the gas therein is compressible, it may act like a spring and compress as the fluid flows into boom accumulator 236. When the pressure of the fluid within passage 244 drops below the pressure of boom accumulator 236, the compressed gas may expand and urge the fluid from within boom accumulator 236 to exit. It is contemplated that boom accumulator 236 may alternatively embody a membrane/spring-biased or bladder type of accumulator, if desired.

In the disclosed embodiment, boom accumulator 236 may be about the same size as or smaller than swing accumulator 108, but configured to hold fluid at a lower pressure. Specifically, boom accumulator 236 may have a volume of about 50-100 L, and be configured to accommodate pressures of about 80-150 bar. It is contemplated, however, that other volumes and pressures may be accommodated by boom accumulator 236, if desired.

Each of first and second charge valves 238, 240 may be a solenoid-operated, variable position, 2-way valve that is movable in response to a command from controller 100 to allow fluid to enter boom accumulator 236 from the respective passages and for fluid from boom accumulator 236 to enter motor 241 via passage 244. In particular, each charge valve 238, 240 may include a valve element that is movable from a first position (shown connected in FIG. 2) at which fluid flow is inhibited, toward a second position at which fluid may freely enter and/or leave boom accumulator 236 substantially unrestricted by the valve element. When the valve element is away from the first position (i.e., in the second position or in an intermediate position between the first and second positions) and a fluid pressure in the respective passages exceeds a fluid pressure within boom accumulator 236, the fluid may move into and fill (i.e., charge) boom accumulator 236. Likewise, when the valve element of charge valve 240 is in the second or intermediate position and the pressure within boom accumulator 236 exceeds the pressure within passage 244, the fluid may exit boom accumulator 236 and pass to motor 241 via passage 244. The valve element may be spring-biased toward the first position and movable in response to a command from controller 100 to any position between the first and second positions to thereby vary a flow rate of fluid into boom accumulator 236.

In some embodiments, a pressure relief arrangement 247 may be associated with boom accumulator 236. Pressure relief arrangement 247 may include a pressure relief valve 248 disposed in parallel with a restriction 250, both located between boom accumulator 236 and tank 60. Pressure relief valve 248 may be normally closed, but selectively moved to a flow-passing position to relieve fluid pressures within boom accumulator 236. Restriction 250 may be configured to continuously leak some fluid from boom accumulator 236 to tank 60. An additional sensor 102 may be associated with boom accumulator 236, at a location between boom accumulator 236 and pressure relief arrangement 247 to generate corresponding pressure signals, and additionally, inin one or more embodiments, corresponding flow rate signals, directed to controller 100. Additionally or alternatively, a state of charge sensor 102a may be associated with boom accumulator 236 to generate any one or more of the state of charge signals, as discussed above, to controller 100.

A bypass arrangement 245 may extend between passages 242 and 244. Bypass arrangement 245 may include a bypass control valve 249 disposed within a bypass passage 251. Bypass control valve 249 may be a solenoid-operated, variable position, 2-way valve that is movable in response to a command from controller 100 to allow fluid from hydraulic cylinder 28 to selectively bypass accumulator 236 and flow directly to motor 241. In particular, control valve 249 may include a valve element that is movable from a first position (shown connected in FIG. 2) at which fluid flow through the respective valve is inhibited, toward a second position at which fluid may freely flow substantially unrestricted from passage 242 to 244 without ever entering or exiting accumulator 236. The valve element may be spring-biased toward the first position, and movable in response to a command from controller 100 to any position between the first and second positions to thereby vary a flow rate of fluid through bypass passage 251. It may be desirable to bypass accumulator 236, for example, when accumulator 236 is already full of pressurized fluid, the fluid being discharged from hydraulic cylinders 28 is less than a pressure of accumulator 236 yet still high enough to drive motor 241, and/or there is an immediate need for power at motor 241 and accumulator 236 has an insufficient supply of accumulated fluid. In one or more embodiments, conditions such as those discussed above wherein it may be desirable to bypass accumulator 236 may be determined or identified by controller 100 in response to various signals. In particular, controller 100 may monitor, receive and process, in part, one or more of signals from sensors 102 connected to sense the pressures and additionally, in one or more embodiments, the flow rates of fluid within and through the head end passage 206, as well as signals from sensor 102 and/or state of charge sensor 102a indicative of pressures and flow rates, and/or a state of charge, respectively, of fluid within boom accumulator 236. Controller 100 may additionally monitor, receive and process, in part, one or more of signals from sensor 102 associated with and indicative of the output pressure and flow rate of motor 241, signals from the pump 58 and/or engine 59 indicative of the output and/or capacity thereof, and/or signals received from input device 48 indicative of an operator's actuation thereof and requested motion of hydraulic system 14. In response to monitoring, receiving and processing of any one or more or any combination of the foregoing signals, such as, for example, a boom accumulator 236 fluid pressure signal and/or state of charge signals indicative of a fully charged state or an insufficient supply of accumulated fluid to drive motor 241 in comparison with a pressure and flow rate signal of fluid being discharged from hydraulic cylinders 28 through head end passage 206 indicative of a pressure/flow rate which may be less than a pressure of accumulator 236 yet still high enough to drive motor 241, and/or any one or more of the foregoing signals associated with the pressure and flow rate of motor 241, output capacity of pump 58 and/or engine 59, and/or requested motion of hydraulic system 14 indicative of an immediate need for power at motor 241, controller 100 may generate and transmit one or more commands including, in part, commands to actuate bypass control valve 249 to its second (or an intermediate) position to allow fluid from hydraulic cylinder 28 to bypass accumulator 236 and flow directly to motor 241 in the manner described above.

Motor 241 may function to convert energy stored in the form of pressurized fluid in boom accumulator 236 (and/or energy in the form of pressurized fluid discharged from hydraulic cylinders 28 via bypass passage 251) to mechanical energy. Specifically, motor 241 may be fluidly connected in parallel to both return passage 228 (downstream of check valve 246) and to boom accumulator 236 via passage 244 and charge valve 240. In this configuration, fluid from either passage may be directed through motor 241 and thereby used to drive motor 241.

Motor 241, in the depicted example, is a variable displacement hydraulic motor that is mechanically coupled to engine 59, to an input shaft of pump 58, and/or to another rotary device. By way of this coupling, motor 241, when driven by pressurized fluid, may mechanically assist engine 59 (e.g., to add power to an already rotating output of engine 59 or to assist in starting engine 59), pump 58, and/or the other rotary device. Motor 241 may assist pump 58 and engine 59 when pump 58 has a positive displacement or, alternatively assist only engine 59 when pump 58 has a neutral displacement. In addition, in some embodiments, engine 59 may selectively drive motor 241 to increase a pressure of the fluid directed through motor 241 and recirculated back to hydraulic cylinders 28. Furthermore, motor 214 may be connected in electronic and controllable communication to controller 100 such that motor 214, including but not limited to the displacement thereof, may be controlled in response to commands from controller 100.

One or more motor control valves may be associated with an outlet of motor 241 and used to regulate operation of motor 241. In the disclosed embodiment, three different control valves are shown, including a tank control valve 252, a rod-end control valve 254, and a head-end control valve 256 all connected in parallel to the outlet of motor 241. Tank control valve 252 may be situated between motor 241 and tank 60, within a drain passage 258. Rod-end control valve 254 may be situated between motor 241 and rod-end passage 208, within a rod-end return passage 260. Head-end control valve 256 may be situated between motor 241 and head-end passage 206 (e.g., via passage 242), within a head-end return passage 262. One or more check valve 264 may be associated with one or more of passages 258-262 to help ensure unidirectional flows within these passages.

Each of control valves 252-256 may be a solenoid-operated, variable position, 2-way valve that is movable in response to a command from controller 100 to allow fluid from motor 241 to enter tank 60, the head-end of hydraulic cylinders 28, or the rod-end of hydraulic cylinders 28, thereby accomplishing different purposes. In particular, each control valve 252-256 may include a valve element that is movable from a first position (shown connected in FIG. 2) at which fluid flow through the respective valve is inhibited, toward a second position at which fluid may freely flow unrestricted by the corresponding valve element. The valve element may be spring-biased toward the first position, and movable in response to a command from controller 100 to any position between the first and second positions to thereby vary a flow rate and/or pressure of fluid through the respective valve. It is contemplated that one or more of valves 252-256 could alternatively be pilot operated and/or pilot assisted, if desired.

Any one or more of control valves 252-256 may be independently and/or simultaneously operable (i.e., moved to the second or an intermediate position) to accomplish different purposes. For example, to extract a maximum amount of energy from the fluid passing through motor 241 (e.g., during an engine starting event), a maximum pressure drop should be generated across motor 241. This maximum pressure drop may occur when the pressure downstream of motor 241 is lowest. In most situations, the maximum pressure drop may occur when only tank control valve 252 is used, and the corresponding element moved completely to the second position. In some situations, however, a greater pressure drop may be generated by using one of rod- and head-end control valves 254, 256 alone or together with tank control valve 252. This may be the case, for example, during an overrunning condition, when the expanding chamber of hydraulic cylinder 28 generates a negative pressure therein. Similarly, when fluid draining from the head-end chamber of hydraulic cylinders 28 passes through motor 241, only a portion of that fluid can be consumed by the rod-end chamber of hydraulic cylinders 28 due to geometric differences between the chambers. In this situation, some of the fluid may be directed into tank 60 via tank control valve 252, while the remaining fluid may be passed to the rod-end chamber via rod-end control valve 254. Rod- and head-end control valves 254, 256 may not normally be used together.

When using one of rod- and head-end control valves 254, 256, the fluid passing through motor 241 may be directed back to hydraulic cylinders 28. This may accomplish several purposes. For example, energy associated with the fluid passing through motor 241 may first be recovered and used to drive engine 59 and/or pump 58, thereby improving an efficiency of machine 10. Alternatively, after imparting energy to motor 241, the fluid may be used for internal regeneration within hydraulic cylinders 28 that helps to reduce voiding. The energy removed by motor 241 prior to fluid recirculation back to hydraulic cylinders 28 may not be needed within hydraulic cylinders 28 during an overrunning condition, as the returning fluid may only be used in this situation to inhibit voiding and not used to move hydraulic cylinders 28. Further, pump 58 may not be required to expend as much energy to provide fluid to hydraulic cylinders 28 during the overrunning condition. Finally, motor 241 may be capable of further increasing the pressure of the fluid being redirected back to hydraulic cylinders 28 during a non-overrunning condition, when motor 241 is being driven by engine 59. Additionally, controller 100 may be configured and connected in electronic communication to monitor, receive and process, in part, any one or more of a plurality of signals indicative of the foregoing conditions and responsively generate commands to actuate the appropriate one or more of control valves 252-256 to accomplish the purposes as described above and further disclosed herein. In particular, in one embodiment, controller 100 may monitor, receive and process, in part, any one or more or any combination of signals from sensors 102 connected to sense the pressures and flow rates of fluid within the head end passage 206 and the rod end passage 208, signals from sensor 102 associated with and indicative of the output or downstream pressures and flow rates of motor 241, signals from sensor 102 and/or state of charge sensor 102a indicative of pressures and flow rates, and/or a state of charge, respectively, of fluid within boom accumulator 236, signals from the pump 58 and engine 59 which may be indicative of the output and/or capacity thereof, and/or signals from input device 48 indicative of an operator's actuation thereof and requested motion of hydraulic system 14. In one or more examples, in response to receiving, monitoring, and processing any one or more or any combination of the foregoing signals, such as, for example, one or more signals indicative of the pressure and/or flow rate within head end passage 206 in comparison with one or more signals indicative of the pressure and/or flow rate within rod end passage 208 as well as any one or more of the foregoing signals associated with the downstream pressure and flow rate of motor 241, output capacity of pump 58 and/or engine 59, and/or requested motion of hydraulic system 14 which may be indicative of an overrunning condition, controller 100 may responsively generate and transmit one or more commands including, in part, commands to actuate tank control valve 252 and/or the appropriate one of rod-end control valve 254 and head-end control valve 256 to their second (or intermediate) positions as discussed above. Controller 100 may also compare one or more received signals indicative of the pressure and flow rate within head end passage 206 with one or more received signals indicative of the pressure and flow rate within rod end passage 208, as well as one or more of the foregoing signals associated with the downstream pressure and flow rate of motor 241 and/or requested motion of hydraulic system 14 to determine and monitor the amount of fluid draining from the head-end chamber of hydraulic cylinders 28 and passing through motor 241 and responsively generate and transmit commands to actuate tank control valve 252 and rod-end control valve 254 to their second (or intermediate) positions to distribute and direct fluid into tank 60 and the rod-end chamber as discussed above. Controller 100 may further generate and transmit commands to actuate the appropriate one or more of control valves 252-256 in response to one or more signals from the sensors 102, 102a and components in combination with commands to direct pressurized fluid to and through motor 241 in connection with events including, in part, engine 59 starting, hydraulic energy conversion, and peak shaving events as further discussed herein.

In some embodiments, an additional pressure relief valve 266 may be associated with the outlet of motor 241. Pressure relief valve 266 may be disposed between motor 241 and return passage 228. Pressure relief valve 266 may normally be closed, but selectively moved to a flow-passing position to relieve fluid pressures downstream of motor 241 (e.g., when motor 241 increases a pressure of the fluid passing therethrough). An additional sensor 102 may be associated with motor 241, and positioned at a location between motor 241 and pressure relief valve 266 to generate corresponding pressure and, additionally, in one or more embodiments, flow rate signals directed to controller 100. Based on these pressure and flow rate signals, controller 100 may be able to properly control operation of valves 252-256.

Swing and boom circuits 52, 54 may be interconnected for flow sharing, energy recuperation, and/or engine starting purposes. For example, a common return passage 268 may extend between swing and boom circuits 52, 54. Common return passage 268 may connect return passage 88 from swing circuit 52 with return passage 228 from boom circuit 54. In this manner, makeup accumulator 110 may be filled with fluid from both circuits 52, 54 and, likewise, makeup accumulator 110 may provide fluid to both circuits 52, 54 and to motor 241 via check valve 246. Finally, a common accumulator passage 272 may extend from swing accumulator 108 of swing circuit 52 to connect with passage 244 of boom circuit 54, and a valve 270 may be disposed within passage 272 to regulate flows of fluid between circuits 52, 54. With this configuration, pressurized fluid from swing accumulator 108 may be passed to boom accumulator 236 via common accumulator passage 272, valve 270, passage 244, and second charge valve 240, and vice versa. Likewise, pressurized fluid from swing accumulator 108 may be passed through and converted to mechanical energy by motor 241 via common accumulator passage 272, valve 270, and passage 244 (e.g., during an engine starting event). In the disclosed embodiment, valve 270 is a solenoid-operated valve that is pilot-assisted (e.g., internally pilot assisted with high pressure fluid from swing accumulator 108), and can be controllably and electronically connected to controller 100 and actuated to regulate the fluid communication of pressurized fluid between circuits 52, 54 in response to commands from controller 100, as further discussed herein. In particular, valve 270 may include a valve element that may be spring-biased toward a first position (shown connected in FIG. 2) at which flow may be inhibited and may be movable to any position between the first position and a second position at which fluid may freely flow substantially unrestricted through common accumulator passage 272 in response to a corresponding command from controller 100 such that valve 270 may be actuated to control and vary the flow of fluid through common accumulator passage 272. Although valve 270 is shown for the purposes of illustration as a two-position valve in the exemplary embodiment of FIG. 2, it should be understood that valve 270 may be embodied as any valve or arrangement of valves capable of being moved or otherwise actuated to control and define the fluid communication of pressurized fluid through common accumulator passage 272 between circuits 52, 54 in response to commands from controller 100.

In some embodiments, an accumulator return passage (not shown) may be included and used to connect an outlet of motor 241 with common accumulator passage 272 to direct high-pressure fluid exiting motor 241 into swing circuit 52 (e.g., into swing accumulator 108) and/or into boom circuit 54 (e.g., into boom accumulator 236). A control valve (e.g., one of motor, head-end, rod-end control valves or another separate control valve) may be disposed within the common accumulator return passage, and be movable to direct the return fluid into the desired circuit(s).

Controller 100 may be configured to selectively cause boom accumulator 236 to charge and discharge, thereby improving performance of machine 10. In particular, a motion of hydraulic system 14 instituted by hydraulic cylinders 28 may consist of segments of time during which hydraulic cylinders 28 are lifting hydraulic system 14, and segments of time during which hydraulic cylinders are lowering hydraulic system 14. The lifting segments may require significant energy from hydraulic cylinders 28 that is conventionally realized by way of pressurized fluid supplied to hydraulic cylinders 28 by pump 58, while the lowering segments may produce significant energy in the form of pressurized fluid that is conventionally wasted through discharge to tank 60. Both the lifting and lowering segments may require hydraulic cylinders 28 to convert significant amounts of hydraulic energy to kinetic energy, and vice versa. The pressurized fluid passing through hydraulic cylinders 28 during lowering, however, still contains a large amount of energy. If the fluid discharged from hydraulic cylinders 28 is selectively collected within boom accumulator 236 during the lowering segments, this energy can then be returned to (i.e., discharged) and reused by hydraulic cylinders 28 during the ensuing lifting segments. Pump 58 (and engine 59) can be assisted during the lifting segments by selectively causing boom accumulator 236 to discharge pressurized fluid through motor 241 (via second charge valve 240 and passage 244), thereby driving pump 58 at the same or greater rate with less engine power than otherwise possible.

As provided above and further provided herein, controller 100 may determine and/or identify the current condition and motion of the hydraulic system 14 of the machine 10 based on one or more of a plurality of signals to responsively effectuate control and operation of the boom circuit 54. In one embodiment, controller 100 may determine and/or identify that the hydraulic cylinders 28 are lifting or lowering hydraulic system 14 (as well as the boom 24, stick 30, work tool 16, and frame 42 of the machine 10 about axis 46) (and may identify and/or determine the segments of time associated with the lifting and lowering movements) in response to corresponding signals from input device 48 indicative of operator-requested lifting and lowering movements of the hydraulic system 14. In particular, controller 100 may determine the lifting and lowering (as well as the lifting and lowering time segments) of the hydraulic system 14 based upon and/or in proportion with the operator's actuation of the input device 48 in a manner to request a lifting or lowering movement, and, in response, may responsively generate and electrically communicate the appropriate commands to the appropriate respective valves to effectuate the discharging of the pressurized fluid from the boom accumulator 236 through the motor 241 for assisting the pump 58 (and engine 59) during lifting segments (such as, for example, by generating and electronically transmitting a command to second charge valve 240 to be actuated to its second position (or an intermediate position) (and, in one example, transmitting a command to tank control valve 252 to be actuated to its second position (or an intermediate position)) as discussed above, and the charging of the boom accumulator 236 with pressurized fluid during lowering segments (such as, for example, by generating and electronically transmitting a command to first charge valve 238 to be actuated to its second position (or an intermediate position) consistent with the foregoing disclosure and as further disclosed herein. In an additional or alternative embodiment, controller 100 may monitor, receive and process, in part, any one or more or any combination of signals associated with the hydraulic circuit 50 in addition to signals from input device 48 indicative of operator-requested lifting and lowering as discussed above. In particular, controller 100 may be configured and connected in electronic communication to monitor, receive and process, in part, any one of more of signals from sensor 102 connected to sense the pressures and flow rates of fluid within the head end passage 206, signals from sensor 102 connected to sense the pressures and flow rates of fluid within the rod end passage 208, and signals received from input device 48 indicative of an operator's actuation of input device 48 and requested motion of hydraulic system 14 instituted by hydraulic cylinders 28. In response to the receiving monitoring, and/or processing of any one or more of the foregoing signals, controller 100 may be configured to interactively identify or define the segments of time during which hydraulic cylinders 28 are lifting hydraulic system 14, and segments of time during which hydraulic cylinders are lowering hydraulic system 14. At substantially the same time, the controller 100 may additionally monitor, receive and process any one of more of signals from sensor 102 and/or state of charge sensor 102a indicative of a pressure of fluid within boom accumulator 236 and/or a state of charge thereof, signals from sensor 102 associated with and indicative of the output pressure and/or flow rate of motor 241, and signals from the pump 58 and/or engine 59 indicative of the output and/or capacity thereof. In response to any one or more of the foregoing signals, the controller 100 may responsively generate and electrically communicate the appropriate commands to the appropriate respective valves to effectuate the charging of the boom accumulator 236 with pressurized fluid during lowering segments and the discharging of the pressurized fluid from the boom accumulator 236 through the motor 241 for assisting the pump 58 (and engine 59) during lifting segments consistent with the foregoing disclosure and as further disclosed herein. In addition to any one or more of the signals as discussed above, the controller 100 may further monitor, receive and process any one of more of signals from sensor 102 and/or state of charge sensor 102a indicative of a pressure of fluid within swing accumulator 108 and/or a state of charge thereof, as well as any one or more of the signals associated with the swing circuit 52 as discussed above in order to identify an operative state or condition of the machine 10 and hydraulic system 14 thereof and responsively generate commands to control the appropriate components as discussed above and as further disclosed herein.

In an alternative embodiment, controller 100 may be configured to additionally or alternatively direct the fluid discharged from boom accumulator 236 during lowering of hydraulic system 14 (or at any other time) into swing circuit 52 (e.g., into swing accumulator 108) to assist movements of swing motor 49. In particular, in one example, in response to the receiving, monitoring, and/or processing any one or more of the appropriate signals indicative of a lowering of hydraulic system 14 (or at any other appropriate condition) as well as signals indicative of the fluid pressures and flow rates within the swing circuit 52 and/or boom circuit 54 (including signals from sensors 102 and/or state of charge sensors 102a indicative of pressures within and/or charge states of (and a pressure/charge state disparity between) the swing accumulator 108 and boom accumulator 236) consistent with any one or more of the embodiments discussed herein, the controller 100 may generate and electronically transmit the appropriate commands to actuate each of second charge valve 240 and valve 270 to their second (or an intermediate) positions such that pressurized fluid from boom accumulator 236 may be fluidly communicated via the foregoing valves through passage 244 and common accumulator passage 272 to swing accumulator 108. Likewise, controller 100 may be configured to additionally or alternatively direct fluid discharged from swing accumulator 108 into boom accumulator 236 and/or through motor 241 in a substantially equivalent fashion as discussed above. Similarly, controller 100 may additionally or alternatively direct fluid discharged from motor 241 into one or both of swing and boom accumulators 108, 236.

Controller 100 may also be configured to implement a version of peak shaving in association with boom circuit 54. For example, controller 100 may be configured to cause boom accumulator 236 to charge with fluid exiting pump 58 (e.g., via control valve 202, head-end passage 206, passage 242, check valve 246, and first charge valve 238) when pump 58 and engine 59 have excess capacity (i.e., a capacity greater than required by boom circuit 54 to move work tool 16 as requested by the operator) during a lifting mode of operation. In particular, in one example, controller 100 may be configured and connected in electronic communication to monitor, receive and process, in part, any one of more of signals received from input device 48 indicative of an operator-requested lifting of hydraulic system 14, signals from the pump 58 and/or engine 59 indicative of an excess available output and/or capacity thereof, signals from signals from sensor 102 connected to sense the pressures and flow rates of fluid within the head end passage 206, signals from sensor 102 connected to sense the pressures and flow rates of fluid within the rod end passage 208, and signals from sensor 102 and/or state of charge sensor 102a indicative of a pressure of fluid within boom accumulator 236 and/or a state of charge thereof. In response to any one or more of the foregoing signals, controller 100 may determine or identify that the boom circuit 54 is in an operative state or condition appropriate for charging boom accumulator 236 with excess capacity from pump 58 and engine 59, and may responsively generate and electronically transmit the appropriate commands to actuate first charge valve 238 to its second (or an intermediate) position (as well as the appropriate commands to control valve 202, and additionally, in one embodiment, the appropriate one or combination of tank control valve 252, rod end control valve 254, and/or head end control valve 256) such that any excess capacity portion of pressurized fluid from pump 58 is directed into boom accumulator 236 as discussed above. During this charging, it may be necessary to restrict the outlet flow of hydraulic cylinders 28 to less than the full flow rate of fluid from pump 58, such that the remaining flow may be forced into boom accumulator 236. Then, during times when pump 58 and/or engine 59 have insufficient capacity to adequately power hydraulic cylinders 28, which may, in one example, be determined or identified by controller 100 in response to signals including, in part, any one or more of the signals indicative of insufficient pump 58 and/or engine 59 capacity as well as available boom accumulator 236 pressurized fluid or charge capacity, the high-pressure fluid previously collected from pump 58 within boom accumulator 236 may be discharged through motor 241, which may, in one example, be effectuated by controller 100 by generating and transmitting one or more commands including, in part, commands to actuate second charge valve 240 to its second (or an intermediate) position (additionally, in one embodiment, the appropriate one or combination of tank control valve 252, rod end control valve 254, and/or head end control valve 256) in the manner described above to assist engine 59 and pump 58.

Controller 100 may further be configured to implement peak shaving in connection with both of swing and boom circuits 52, 54. In particular, excess fluid from pump 58 may be directed, by way of common accumulator passage 272 (and actuation of valve 270 which may be via controller 100 in a substantially similar manner as discussed above) between circuits and stored within either of swing or boom accumulators 108, 236.

In some embodiments, an electric starting motor 274 may be used alone or in conjunction with motor 241 to start engine 59. Starting motor 274 may be supplied with power from an onboard battery 275, regulated by controller 100, and connected to engine 59 in any conventional manner. In particular, in one embodiment, electric starting motor 274 may be operatively connected and configured to effectuate the starting or ignition of the engine 59 (or assist in the starting or ignition of the engine 59) by, for example, countershaft 71, a belt, a gear box, or in any other suitable manner, either alone or in concert with motor 241, when necessary and in a manner consistent with and in response to commands from controller 100, as further discussed herein.

Figure 3:
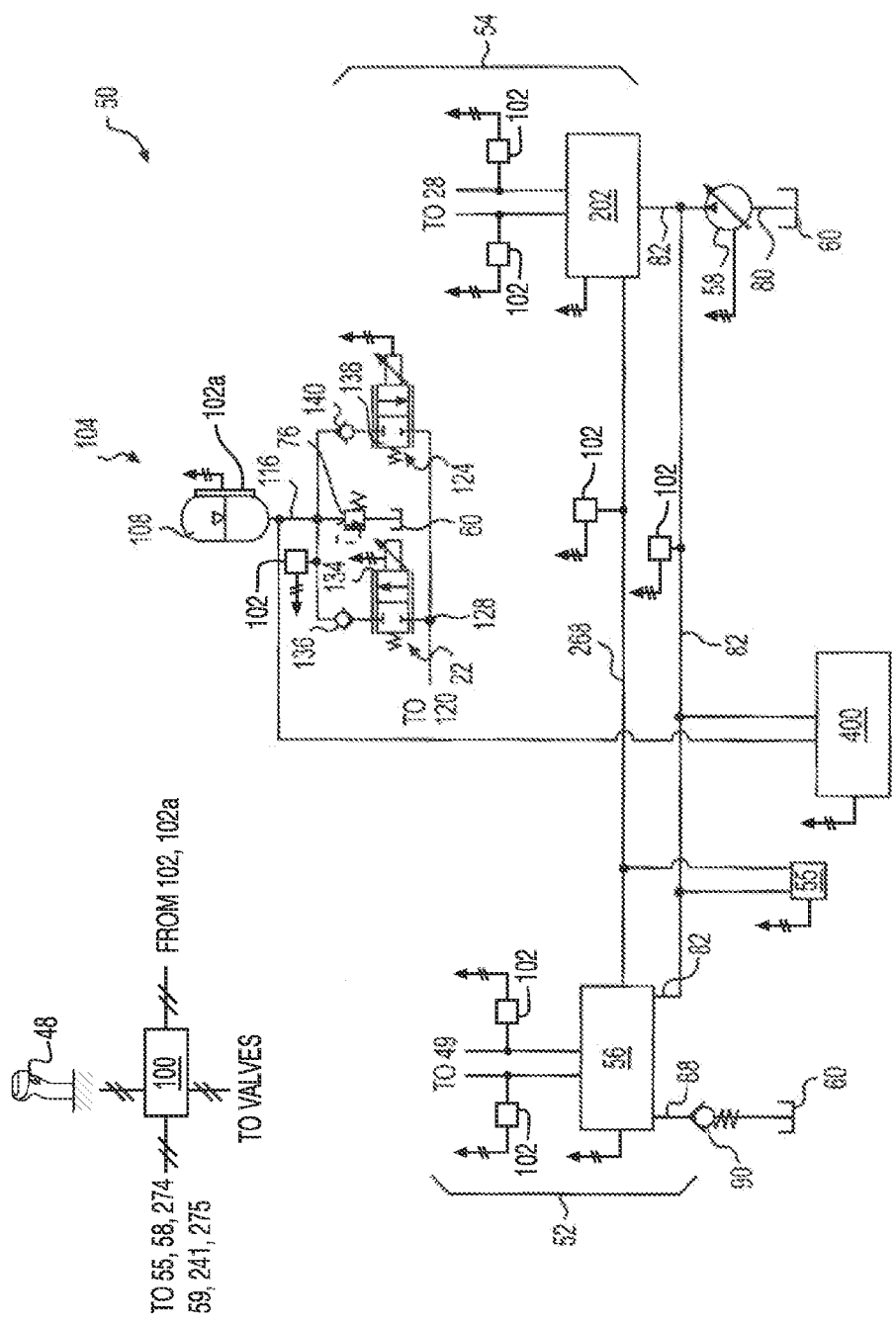
FIGS. 3-5 are schematic illustrations of optional exemplary disclosed valve arrangements that may be used in conjunction with the hydraulic system of FIG. 2.
Figure 4:
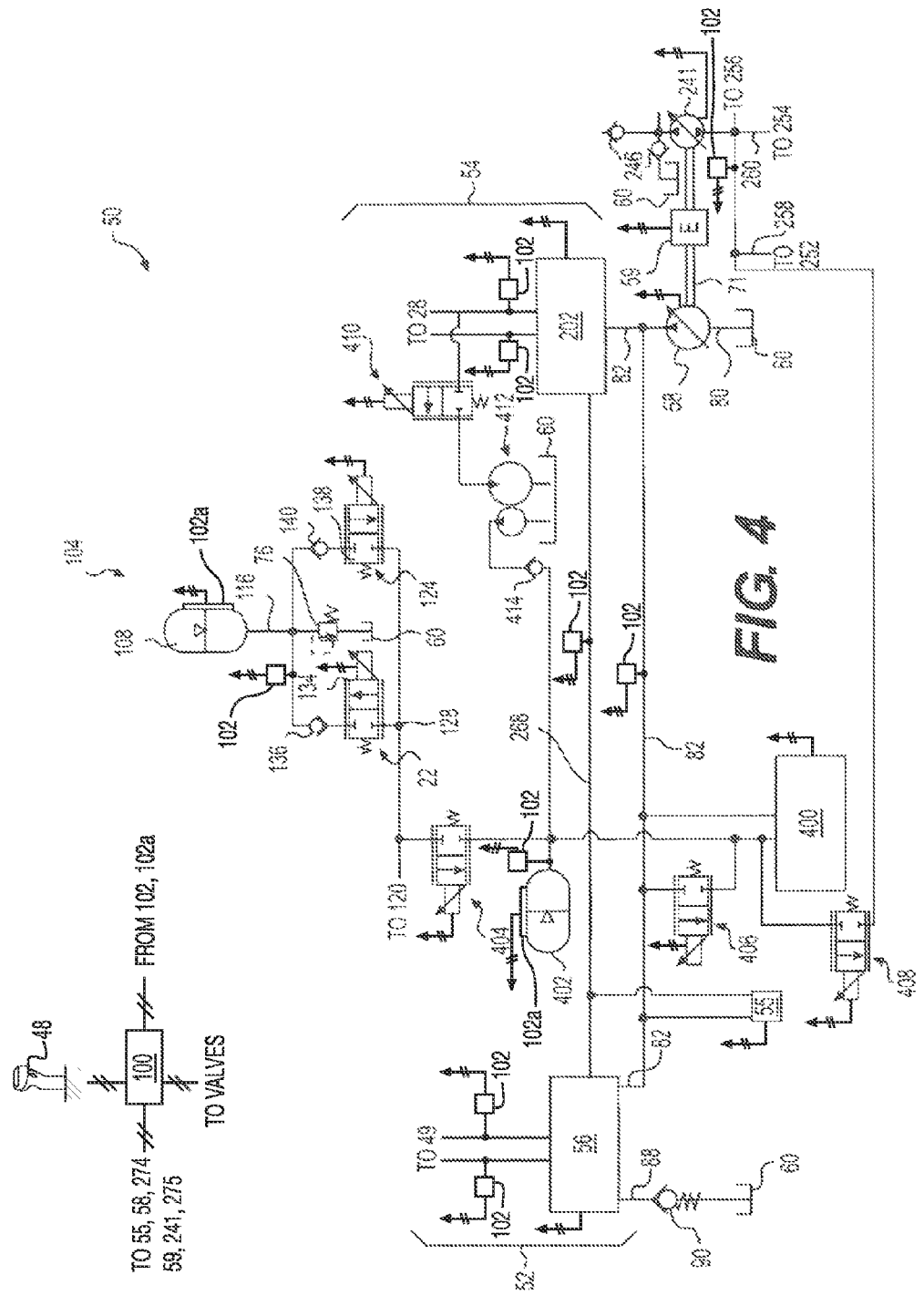
Figure 5:
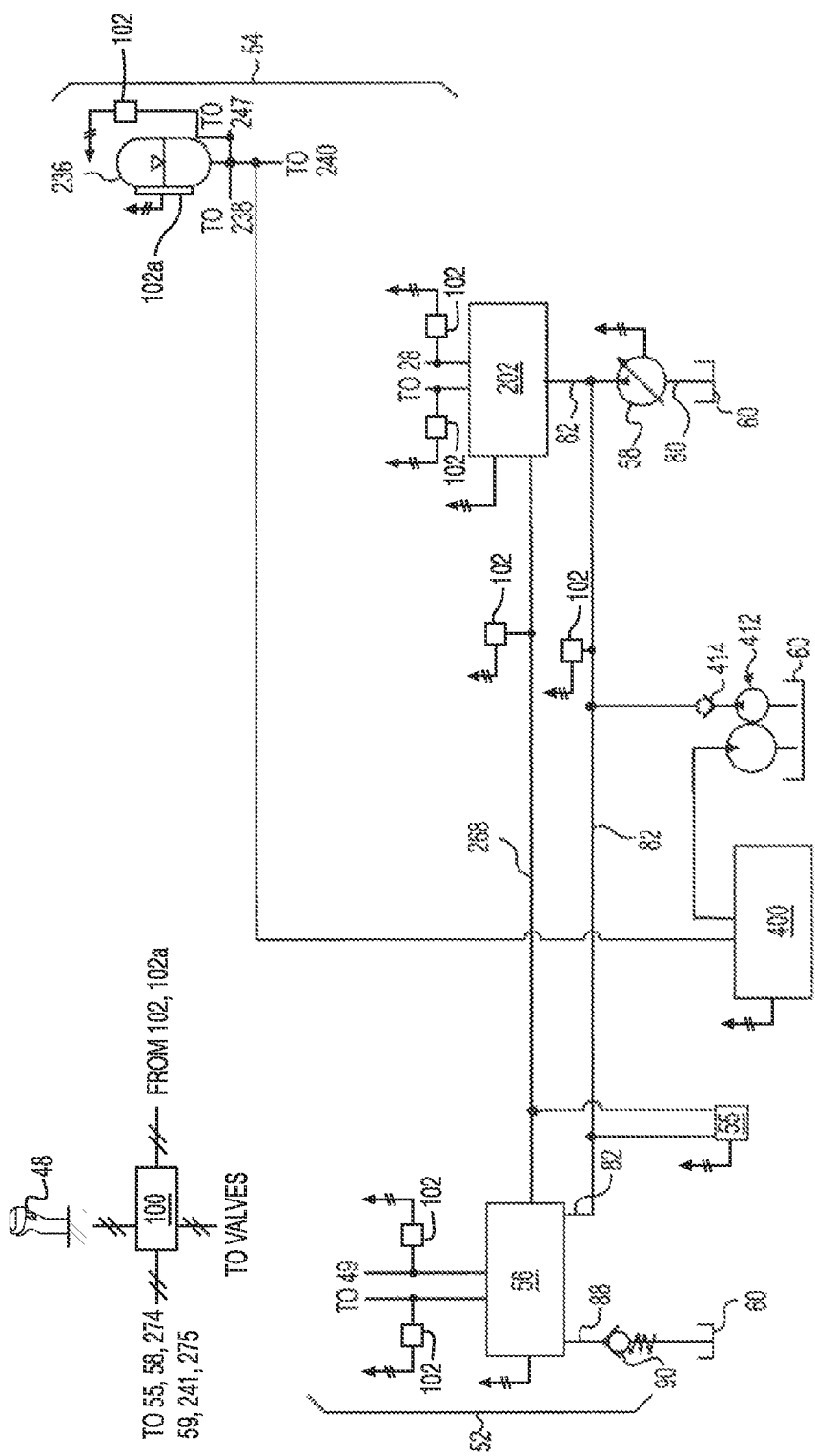

As will be described in more detail below, there may be times when engine 59 is shut down and the operator requests movement of work tool 16. When this occurs, it may be possible for the movement to be accommodated through use of accumulated high-pressure fluid while engine 59 remains shutdown and/or while engine 59 is being started. Additionally, controller 100 may be connected in electronic controllable and/or sensing communication to generate and transmit the appropriate commands to monitor, regulate, and/or effectuate control and operation of the hydraulic circuit 50 to accommodate movement of the hydraulic system 14 while engine 59 remains shutdown and/or while engine 59 is being started in a manner consistent with any one or more of the embodiments as disclosed herein. FIGS. 3-5 are simplified illustrations of hydraulic circuit 50 depicting different configurations that could be used to control this functionality.

As shown in the simplified illustration of FIG. 3, a control valve 400 may be used to selectively control flows of fluid from swing accumulator 108 to any one of hydraulic cylinders 28, 36, 38 and/or swing motor(s) 49 ("the actuators") when engine 59 is shutdown and/or being started. During these situations, when the operator of machine 10 manipulates input device 48 to request movement of the actuators, pressurized fluid from swing accumulator 108 may be provided to the corresponding circuits (52, 54, 55) of the particular actuators via control valve 400 (e.g., by way of discharge passage 82). During engine operation, as long as pressurized fluid is available within swing accumulator 108, fluid directed to the actuators may come from pump 58 alone, from swing accumulator 108 alone, or from a combination of the different sources. When pressurized fluid is not available within swing accumulator 108 and engine 59 is operational, the required fluid may be provided by pump 58 alone. High-pressure fluid from pump 58 may be selectively used to charge swing accumulator 108 via valve 400 any time pump 58 has excess capacity. Fluid being discharged from swing motor 49 may likewise be directed into swing accumulator 108 (e.g., via valve 134), as long as the fluid has a sufficiently high pressure. Otherwise, the fluid discharged from the swing motor 49 may be directed to tank 60 via valve 56 and passage 80 or via passage 268, motor 241 (referring to FIG. 2), and valve 252. FIG. 4 illustrates another embodiment, in which accumulated fluid can be used to power any one of hydraulic cylinders 28, 36, 38 and/or swing motor(s) 49 ("the actuators") when engine 59 is shutdown and/or being started (i.e., when pump 58 is not pressurizing fluid or pressurizing too little fluid). In the embodiment of FIG. 4, hydraulic circuit 50 includes an additional accumulator 402 that supplies previously collected high-pressure fluid through control valve 400 to discharge passage 82. Accumulator 402 may have a size and/or a pressure larger than swing and boom accumulators 108, 236. For example, accumulator 402 may be configured to collect 35 L or more of fluid having a pressure of about 350 bar or higher.

The fluid collected within accumulator 402 may come from any combination of different sources. For example the fluid may be directed from swing circuit 52 (e.g., from motor 49 and/or swing accumulator 108) through a valve 404 into accumulator 402. Additionally or alternatively, the fluid may be directed into accumulator 402 from discharge passage 82 (i.e., from pump 58) via a valve 406, and/or from motor 241 via a valve 408. Finally, the fluid may be directed into accumulator 402 from boom circuit 54 (e.g., from hydraulic cylinders 28 and/or boom accumulator 236) via a valve 410. Because the pressures within boom circuit 54 may generally be lower than required within accumulator 402, the fluid from boom circuit 54 may first be directed through an intensifier 412 and a check valve 414 before being directed into accumulator 402. Intensifier 412 may essentially consist of a motor element coupled with a pump element, the motor element being driven by the pressurized fluid from boom circuit 54 to power the pump element and pressurize fluid from tank 60 to an even higher pressure. Valves 404-410 may be substantially identical, and include a proportional valve element that is solenoid operable against a spring bias to any position between a completely closed position and a completely open position.

FIG. 5 illustrates yet another embodiment, in which fluid accumulated within boom circuit 54 can be used to power any one of hydraulic cylinders 28, 36, 38 and/or swing motor(s) 49 ("the actuators") when engine 59 is shutdown and/or being started (i.e., when pump 58 is not pressurizing fluid or pressurizing too little fluid). In the embodiment of FIG. 5, hydraulic circuit 50 does not require additional accumulator 402, but instead uses boom accumulator 236 (similar to the way that the embodiment of FIG. 3 utilizes swing accumulator 108). For example, control valve 400 may be configured to receive fluid from boom accumulator 236, and selectively direct the fluid through intensifier 412 and check valve 414 into discharge passage 82.

Figure 6:
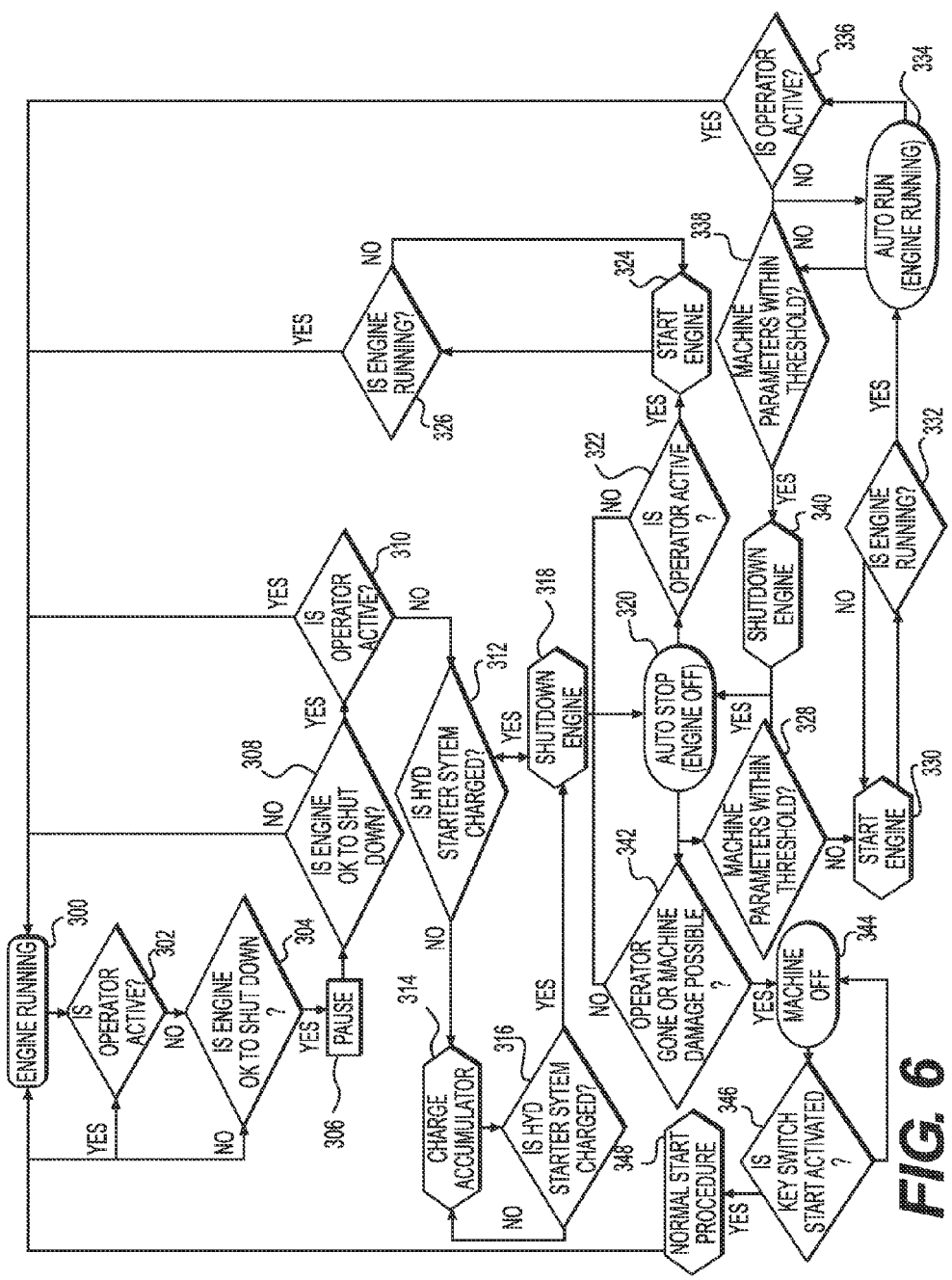
FIGS. 6 and 7 are flowcharts illustrating exemplary disclosed methods of engine control that may be performed by the hydraulic system of FIG. 2.
Figure 7:
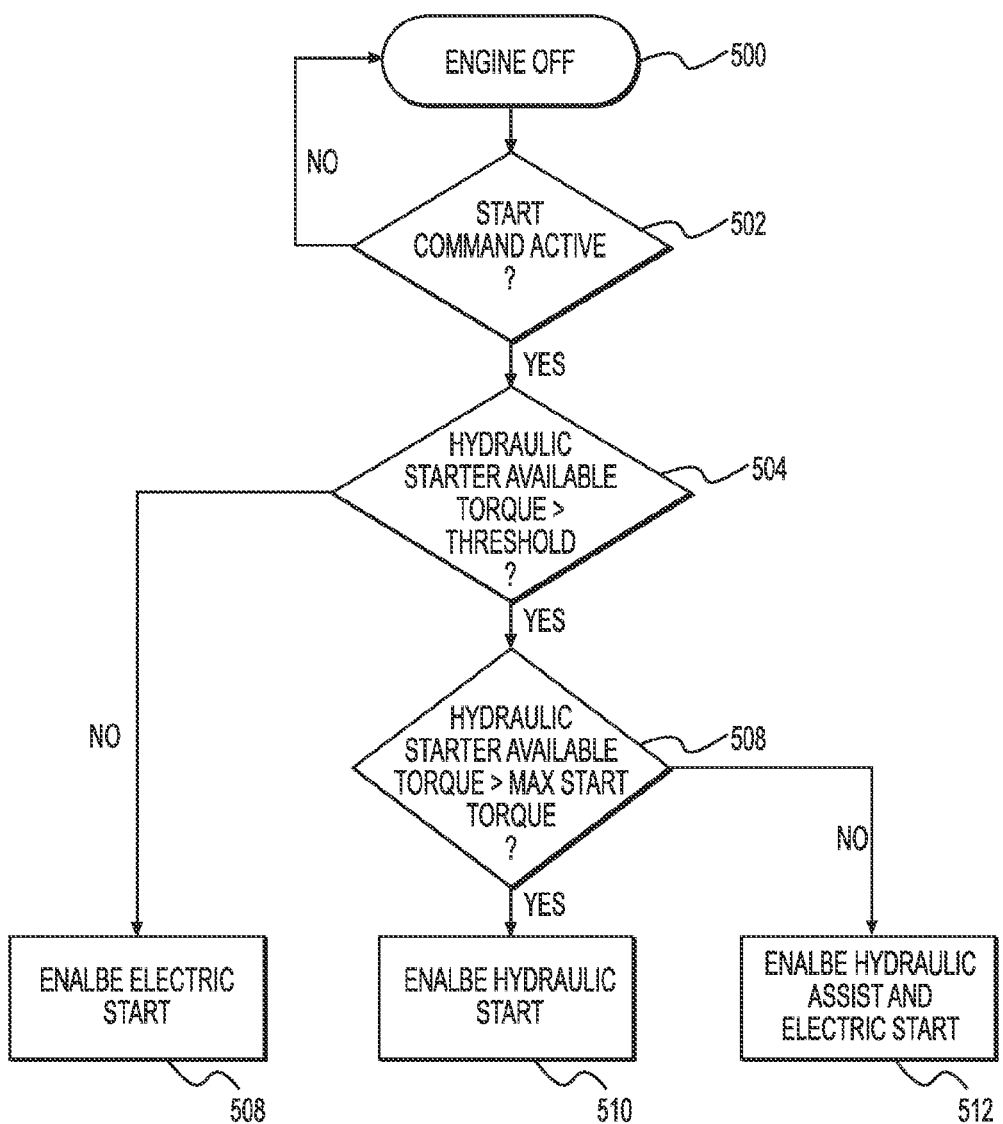

Control valve 400 from any of the embodiments of FIGS. 3-5, may take on any form known in the art. For example control valve 400 could embody a solenoid-operated proportional control valve movable to any position between a closed position and a fully open position. And the movement of control valve 400 may be controlled based on a desired flow rate of fluid into and/or out of the actuators, a measured pressure of accumulated fluid, and/or monitored operational conditions of pump 58. In another embodiment, control valve 400 could be a load-sense valve, wherein the flow rate of fluid may be regulated based on a pressure of the fluid passing through control valve 400 and a pressure of the fluid being discharged by pump 58. In yet another embodiment, control valve 400 may be pressure-compensated. Specifically, control valve 400 could include a pressure compensating element that moves to help ensure that the flow rate of fluid passing through valve 400 (for a given opening area) remains substantially constant and reliable regardless of fluctuations in pressure. As provided above, controller 100 may be connected in electronic and controllable communication to generate and transmit commands to actuate control valve 400 as disclosed in any of the embodiments of FIGS. 3-5 discussed above to control and direct flows of fluid from swing accumulator 108, accumulator 402, or boom accumulator 236 (again, consistent with any of the embodiments of FIGS. 3-5 discussed above) to any one or more of hydraulic cylinders 28, 36, 38 and/or swing motor(s) 49 consistent with and in response to signals received from input device 48 indicative of an operator's actuation of input device 48 and requested motion of hydraulic system 14 when engine 59 is shutdown and/or being started as provided above. In a manner consistent with the embodiments of FIGS. 3-5 as well as FIG. 2 as discussed above, controller 100 may also be connected in electronic and controllable communication to generate and transmit commands to actuate the valves 400 and valves 404-410 as well as any one or more of the valves of the hydraulic system 50 to direct flows of fluid to facilitate, in part, charging of the embodiment-specific accumulator 108, 402, 236 consistent with the embodiments of FIGS. 3-5 discussed above based upon the appropriate signals from sensors 102, 102a as well as the components of the hydraulic system 50 as disclosed above in FIG. 2. FIGS. 6 and 7 illustrate different methods of engine and hydraulic circuit control. FIGS. 6 and 7 will be described in more detail below to further illustrate the disclosed concepts.

Figure 8:
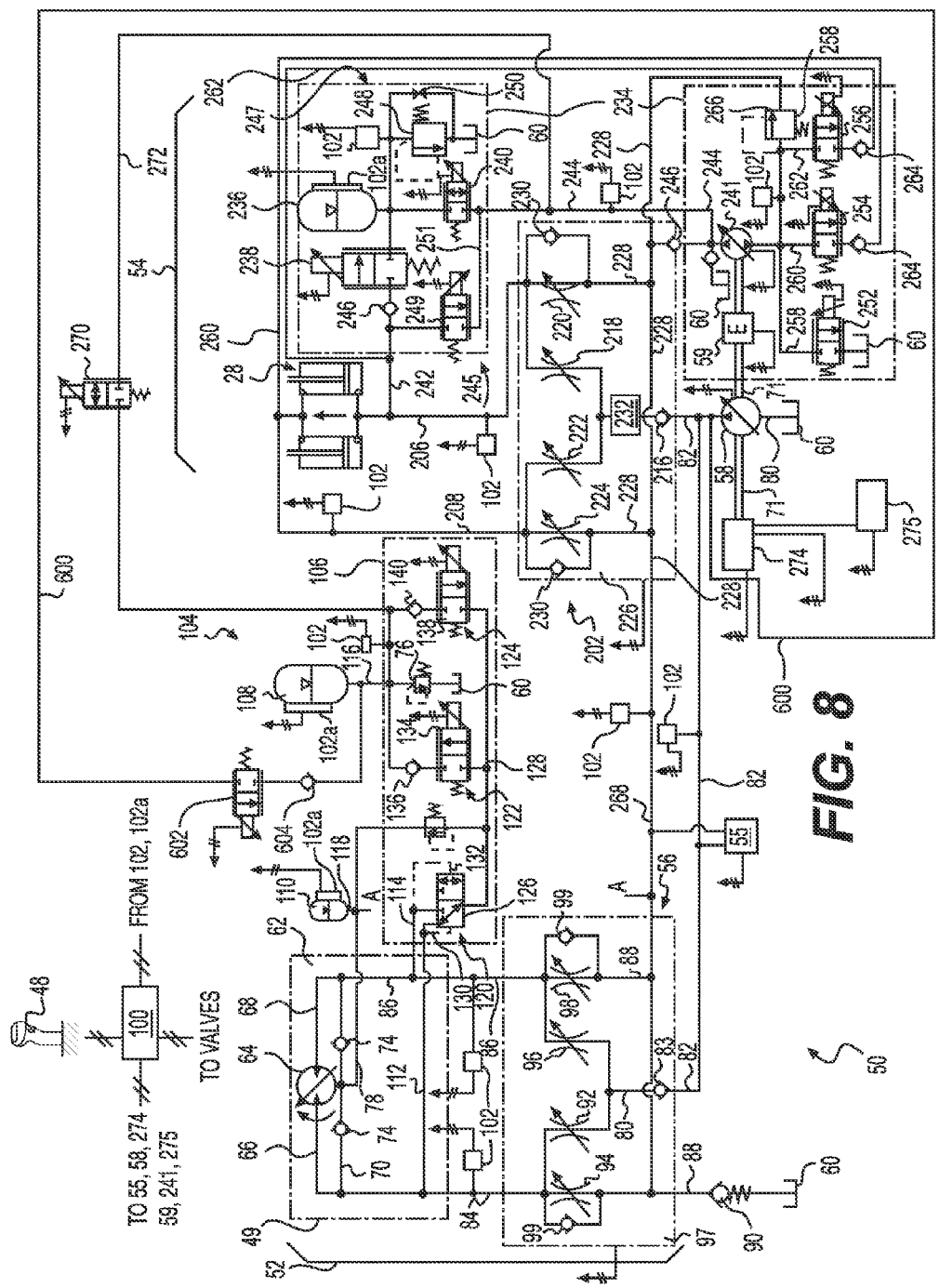
FIG. 8 is a schematic illustration of an additional embodiment of the hydraulic system of FIG. 2.

FIG. 8 is an illustration of an additional embodiment of hydraulic circuit 50 illustrating an additional flow path which may be utilized to charge swing accumulator 108 with pressurized fluid from pump 58, such as, in one example, prior to a machine 10 shut down event to provide swing accumulator 108 with charge energy in the form of pressurized hydraulic fluid sufficient to effectuate an ensuing engine 59 restart as disclosed herein. In particular, as shown in FIG. 8, hydraulic circuit 50 may include a charge passage 600 fluidly communicating the outlet of pump 58 with swing accumulator 108, extending between and fluidly connecting the discharge passage 82 of pump 58 to the passage or conduit 116 fluidly connected to swing accumulator 108. A valve 602 may be disposed within charge passage 600 to regulate the communication of pressurized fluid from pump 58 to swing accumulator 108. In particular, valve 602, may be a solenoid-operated, variable position, 2-way valve fluidly disposed within charge passage 600 between pump 58 and swing accumulator 108 that is movable in response to a command from controller 100 to allow pressurized fluid from the outlet of pump 58 to be fluidly communicated to charge swing accumulator 108. Valve 602 may include a valve element that is movable from a first position (shown connected in FIG. 8) at which fluid flow through valve 602 and charge passage 600 is inhibited, toward a second position at which fluid may freely flow unrestricted by the corresponding valve element. The valve element may be spring-biased toward the first position, movable in response to a command from controller 100 to any position between the first and second positions to thereby vary a flow rate of fluid from pump 58 to swing accumulator 108. A check valve 604 may be disposed within charge passage 600 between valve 602 and swing accumulator 108 to provide for a unidirectional flow of fluid into swing accumulator 108 via charge valve 602. The additional components of hydraulic circuit 50 as disclosed in FIG. 8 may function in a manner consistent with any one or more of the embodiments as disclosed herein, including those discussed in connection with FIG. 2 (as well as any one or more of the embodiments of FIGS. 3-5) and methods of FIGS. 6 and 7.

INDUSTRIAL APPLICABILITY

The disclosed hydraulic circuit may be applicable to any machine that performs a substantially repetitive work cycle, which involves swinging and/or lifting movements of a work tool. The disclosed hydraulic circuit may help to improve machine performance and efficiency by assisting movements of the work tool with accumulators during different segments of the work cycle. In addition, the disclosed hydraulic circuit may help to improve machine efficiency by capturing and reusing otherwise wasted energy in a number of different ways, including restarting the associated engine when shut down during idle periods. Control of hydraulic circuit 50 will now be described in detail.

During operation of machine 10, engine 59 may drive pump 58 to draw fluid from tank 60 and pressurize the fluid. The pressurized fluid may be directed, for example, into the head-end chambers of hydraulic cylinders 28 via head-end supply element 218, while at the same time fluid may be allowed to flow out of the rod-end chambers of hydraulic cylinders 28 via rod-end drain element 224. This operation may cause hydraulic cylinders 28 to extend and raise boom 24.

In some applications, fluid previously collected within boom accumulator 236 may assist the raising of boom 24. For example, pressurized fluid from within boom accumulator 236 may be directed through charge valve 240 and passage 244 to motor 241. This fluid may be further pressurized by motor 241, and directed to the head-end chambers of hydraulic cylinders 28 via head-end control valve 256 and passage 262. This fluid may supplement the supply of fluid from pump 58 or may be the sole source of fluid used to raise boom 24, as desired. Because the fluid within boom accumulator 236 may be pressurized to some extent already, the energy required to further pressurize the fluid may be less than required by pump 58 to fully pressurize fluid drawn from tank 60. Accordingly, a savings may be realized by using fluid from boom accumulator 236 to help raise boom 24.

Similarly, the fluid being discharged from the rod-end chambers of hydraulic cylinders 28 may be selectively collected within boom accumulator 236 and/or used to drive motor 241. That is, in some applications, the fluid being discharged from hydraulic cylinders 28 may have an elevated pressure. For example, when boom 24 is engaged with work surface 26 and a portion of frame 42 is raised away from work surface 26, the weight of machine 10 may pressurize fluid being discharged from the rod-end chambers during raising of boom 24 (i.e., during lowering of frame 42). The pressurized fluid may be directed from rod-end drain element 224 through return passage 228, past check valve 246, and through motor 241 (i.e., to drive motor 241) or into passage 244 and boom accumulator 236 via charge valve 240. By driving motor 241 with the fluid, some energy contained within the fluid may be transferred to engine 59 and/or pump 58, thereby improving the efficiency of machine 10.

Lowering of boom 24 may be achieved in similar manner. In particular, fluid pressurized by pump 58 may be directed into the rod-end chambers of hydraulic cylinders 28 via rod-end supply element 222, while at the same time fluid may be allowed to flow out of the head-end chambers of hydraulic cylinders 28 via head-end drain element 220. This operation may cause hydraulic cylinders 28 to retract and lower boom 24.

In some applications, fluid previously collected within boom accumulator 236 may assist the lowering of boom 24. For example, pressurized fluid from within boom accumulator 236 may be directed through charge valve 240 and passage 244 to motor 241. This fluid may be further pressurized by motor 241 (or alternatively energy may be absorbed from this fluid by motor 241), and then directed to the rod-end chambers of hydraulic cylinders 28 via rod-end control valve 254 and passage 260. This fluid may supplement the supply of fluid from pump 58 or may be the sole source of fluid used to lower boom 24, as desired. As described above, reducing the load on pump 58 may improve the efficiency of machine 10.

Similarly, the fluid being discharged from the head-end chambers of hydraulic cylinders 28 may be selectively collected within boom accumulator 236 and/or used to drive motor 241. That is, in some applications, the fluid being discharged from hydraulic cylinders 28 may have an elevated pressure. For example, when boom 24 is loaded with material, the weight of the material (and of boom 24, stick 30, and work tool 16) acting through boom 24 may pressurize fluid being discharged from the head-end chambers of hydraulic cylinders 28 during lowering of boom 24. The pressurized fluid may be directed from the head-end chambers past check valve 246 and through charge valve 238 into boom accumulator 236. Additionally or alternatively, the fluid being discharged from the head-end chambers may be directed through passage 242, bypass control valve 249, and passage 244 to motor 241. This high-pressure fluid may then drive motor 241 to impart energy to engine 59 and/or pump 58.

FIG. 6 illustrates a control method used to selectively shut down and restart engine 59, to improve efficiencies of machine 10 during idle periods of time. As see in the flowchart of FIG. 6, control may initiate after engine 59 is already operational (Step 300). Controller 100 may then check to see if the operator is inside machine 10 and actively operating machine 10 (Step 302). Controller 100 may determine that the operator is inside machine 10 and actively operating machine 10 based on any number of parameters known in the art. For example, the operator may be determined to be inside station 22 based on activation of a seatbelt sensor, a door sensor, or another similar sensor, and actively operating machine 10 based on detected movement of input device 48. If the operator is inside machine 10 and actively operating machine 10, control may return to step 300.

When controller 100 determines that the operator is not inside machine 10 or inside but not actively operating machine 10 (e.g., for at least a minimum threshold period of time), controller 100 may check to see if it is ok to shut down engine 59 (Step 304). In some situations, shutting down engine 59 could cause damage to engine 59 and/or other machine components, or present undesired situations. These situations may occur when engine 59 is operating at a speed above or below a desired range, when an exhaust treatment device of engine 59 is undergoing a regeneration event, when a temperature of engine 59 falls outside of a desired range, when a battery 275 level is too low to restart engine 59, etc. Controller 100 may determine if it is ok to shut down engine 59 by checking the status of these conditions. If controller 100 determines it is not ok to shut down engine 59, control may return to step 300. Otherwise, controller 100 may pause for a predetermined period of time (Step 306), and then perform the check again (Step 308) for redundancy purposes. In one embodiment, the pause may last for about 15 seconds. It is contemplated that steps 306 and 308 may be omitted, if desired.

Following step 308, controller 100 may check to see if the operator has become active during completion of steps 304-308 (Step 310). If the operator has initiated movement of input device 48 during this time, control may return to step 300. However, if at step 310, controller 100 determines that the operator has remained inactive, controller 100 may check to see if swing accumulator 108 has accumulated sufficient fluid and/or charge energy to hydraulically restart engine 59 (Step 312), such as, for example, via signals from sensor 102 and/or state of charge sensor 102a. In particular, based on a pressure of fluid within swing accumulator 108, or additionally or alternatively, a state of charge of swing accumulator 108 (which may include and be determined based upon signals from sensor 102 and/or state of charge sensor 102a indicative of a pressure and flow rate, and/or a state of charge, respectively, of fluid within swing accumulator 108, as discussed above) controller 100 may be able to determine (e.g., based on a map stored in memory) if a sufficient volume of fluid and/or swing accumulator 108 state of charge exists to restart engine 59. It should be noted that controller 100 may be configured to primarily use swing accumulator 108 to restart engine 59 due to the higher pressure capacity of swing accumulator 108. However, it may be possible in some embodiments, to alternatively or additionally use makeup accumulator 110, boom accumulator 236, and/or accumulator 402 to restart engine 59, if desired.

If controller 100 determines at step 312 that swing accumulator 108 (or any combination of the other accumulators) does not have enough fluid energy and/or state of charge at the right pressure, temperature, volume, energy capacity, etc. to restart engine 59, controller 100 may cause swing accumulator 108 to be charged (Step 314). As described above, swing accumulator 108 may be charged in any number of different ways, including by directing pressurized fluid from pump 58 into swing accumulator 108, consistent with any of the embodiments as disclosed herein, such as in one example, by generating and electronically transmitting a signal to valve 602 to be actuated or moved to its second position (or an intermediate position) to allow fluid from pump 58 to enter swing accumulator 108 via charge passage 600, as shown in the embodiment of FIG. 8 and discussed above. Controller 100 may continue to check on the charge of swing accumulator 108 (Step 316), and then proceed to shut engine 59 down (Step 318) when sufficient charge has been detected. In one example, controller 100 can be electronically and controllably connected to effectuate engine 59 shutdown by cutting off, disconnecting, or otherwise preventing a flow of fuel to the engine 59 or otherwise disengaging fuel combustion of engine 59, which can be by generating and electronically transmitting an engine shutdown command to the engine 59 and/or the fuel supply system thereof, such as, for example, to fuel injectors or fuel pumps (not shown) associated with the engine 59, and in one embodiment, one or more electric drivers and/or controllers associated therewith.

When engine 59 is off (Step 320), controller 100 may continuously monitor at least three different things. For example, controller 100 may monitor the operator to determine if the operator has become active (Step 322), monitor machine parameters to see if they have deviated from desired levels (Step 328), and check to see if the operator has left station 22 or if machine 10 is experiencing unexpected problems (Step 342). Engine 59 may remain off, at step 320, as long as the operator remains inactive inside station 22, the machine parameters are within threshold limits, and no problems with machine 10 have been detected.

However, if at step 322, controller 100 determines that the operator has become active, controller 100 may cause engine 59 to restart (Step 324) and thereafter confirm operational status of engine 59 (Step 326). In one example, controller 100 can be electronically and controllably connected to effectuate engine 59 ignition or re-start, in part, by generating and electronically transmitting an engine start command to the engine 59 and/or the fuel supply (or combustion) system thereof, to resume the flow of fuel to the engine 59, as well as the appropriate valves controlling the supply of pressurized fluid to actuate motor 241 and/or the electric starting motor 274 as provided herein. Control may loop from step 324 through step 326 until controller 100 confirms that engine 59 has been restarted. Control may then return to step 300.

At step 328, controller 100 may compare various machine parameters (e.g., battery levels, ambient temperatures, engine block temperatures, hydraulic pressures, etc.) to threshold levels, and selectively cause engine 59 to restart (Step 330) if any one or more of these parameters deviate from desired values. For example, if the battery 275 of machine 10 nears a minimum voltage level required to restart engine 59, controller 100 may cause engine 59 to restart and charge the battery 275. Similarly, if ambient and/or engine block temperatures fall to levels that may make restarting of engine 59 difficult, controller 100 may cause engine 59 to restart. Controller 100 may then confirm operational status of engine 59 (Step 332), and control may loop from step 330 through step 332 until controller 100 confirms that engine 59 has been restarted.

When engine 59 has been successfully restarted (Step 334), controller 100 may again check to see if the operator is active (Step 336) and if the machine parameters are within the desired range (Step 338). As long as the operator remains inactive and the machine parameters are outside the desired range, controller 100 may keep engine 59 running (control may loop from step 334 through steps 336 and 338). From step 336, when controller 100 determines that the operator has become active, control may return to step 300. And from step 338, when the machine parameters return to within their desired range (and the operator is still inactive), engine 59 may be shut down again (Step 340), and control may return to step 320.

Each time that control returns to step 320, controller 100 may increment a counter and use the counter to determine if machine 10 is experiencing any problems. In particular, it may be possible for a problem with the battery 275 of machine 10, with an engine block temperature sensor, or with another component to occur and cause engine 59 to repeatedly shut down. In this situation, controller 100 may be able to detect the malfunction based on the cycle count, and selectively respond to inhibit further machine damage from occurring. Specifically, at step 342, controller 100 may determine that further machine damage is possible (e.g., based on the count of shutdown events), and selectively shut all of machine 10 down (i.e., not just engine 59) (Step 344). It should be noted that controller 100 may be able to determine that further machine damage is possible in other ways, if desired. Controller 100 may also cause all of machine 10 to shut down at step 344 when the operator leaves station 22. Once all of machine 10 has been shut down, controller 100 may only allow machine 10 to restart when the operator manually requests such a restart (e.g., by way of a key switch) (Step 346). Thereafter, controller 100 may follow a normal start routine (Step 348), and control may return to step 300.

As described above, engine 59 may be restarted using electric start motor 274 alone, motor 241 alone, or both motors 241 and 274. In most engine restart situations, such as those described above with respect to the flowchart of FIG. 6, engine restart may be initiated primarily using motor 241 so as to extend the life of electric start motor 274 and the associated circuitry. The flowchart of FIG. 7 illustrates one exemplary way of determining how to restart engine 59.

As can be seen in FIG. 7, the method of FIG. 7 may initiate when engine 59 is off (Step 500) and a command to restart has been received (Step 502). The command to restart may come directly from the operator of machine 10 or, alternatively through completion of any number of different automated processes like that of FIG. 6. Regardless of the source of the restart command, when the command to restart is received, controller 100 may determine if sufficient hydraulic power exists within any one or more of accumulators 108, 110, 236, 402 to assist in starting engine 59 (Step 504). For example, controller 100 may obtain, receive, and/or monitor signals generated by sensor 102 indicative, in part, of an actual pressure of fluid within swing accumulator 108, and may reference the actual pressure of the fluid within swing accumulator 108 with a lookup map stored in memory to determine if a threshold amount of torque capacity exists. In other words, controller 100 may determine if the amount and pressure of the fluid within swing accumulator 108, when directed through motor 241, is enough to at least assist in starting engine 59. If the pressure of the fluid in swing accumulator 108 is below the threshold level (e.g., about 75 kPa), controller 100 may energize electric start motor 274 to start engine 59 without any assistance (Step 506), such as, for example, by generating and electronically transmitting an engine start command to actuate electric starting motor 274 to execute a fully electric engine 59 start without any assistance from motor 241.

If a minimum torque capacity exists to hydraulically assist the starting of engine 59 (i.e., if fluid having at least a minimum pressure has been accumulated within swing accumulator 108), then controller 100 may determine if enough torque capacity exists to start engine 59 with motor 241 alone. Specifically, controller 100 may reference the pressure of the fluid within swing accumulator 108 with the lookup map to determine if the torque capacity of motor 241, when fed with the accumulated fluid, is greater than a maximum torque capacity (Step 508). If the torque capacity of motor 241 is greater than the maximum torque capacity (i.e., if the pressure of the fluid within swing accumulator 108 is greater than about 300 bar), then controller 100 may cause motor 241 to hydraulically restart engine 59 alone (Step 510), such as, in one example, by generating and electronically transmitting an engine start command to actuate valve 270 to direct and control the release of pressurized hydraulic fluid from swing accumulator 108 to operatively engage and actuate the motor 241 execute a fully hydraulic start or ignition of engine 59 without any assistance from electric starting motor 274. Otherwise, controller 100 may cause motor 241 to hydraulically assist electric starting motor 274 in starting engine 59 (Step 512), such as, in one example, by generating and electronically transmitting an engine start command to actuate both valve 270 as well as electric starting motor 274 to both operatively engage and actuate the motor 241 in concert to execute a combined or "blended" hydraulic and electric start or ignition of engine 59. In addition to electronically transmitting an engine start command to valve 270 and/or electric starting motor 274 according to any one or more of the embodiments as discussed above and further disclosed herein, controller 100 may also generate and electronically transmit a command to tank control valve 252 to be actuated or moved to its second position (or an intermediate position) (and in one or more examples, one of rod- and head-end control valves 254, 256) to ensure a maximum pressure drop during the ignition of engine 59.

In another embodiment, controller 100 may determine and effectuate control of engine 59 restart, based, at least in part, on the state of charge of any one or more of accumulators 108, 110, 236, 402. It should be noted that although any one or more of accumulators 108, 236, 402 could be utilized in various embodiments, for the purposes of illustration, an embodiment utilizing swing accumulator 108 is discussed. In particular, a restart command may be generated and electronically transmitted to controller 100, in one example, in response to an operator initiating or requesting an engine 59 restart by actuating an input device 48 (such as any one or more of a joystick, pedal, ignition switch, start button, or the like) (or alternatively, generated via controller 100 in response to machine 10 conditions consistent with any one or more of the embodiments disclosed herein). In response to the restart command, controller 100 may obtain, receive, and/or monitor and process signals generated by state of charge sensor 102*a* (such as one or more of signals indicative of pressure, volume, temperature signals, etc. as discussed above, and in one embodiment, may additionally receive and process signals from sensor 102) to determine a state of charge of swing accumulator 108, which can, as discussed above, be defined as and indicative of the dynamic, pressurized, thermal, and/or volumetric fluid charge energy of and available within swing accumulator 108. Controller 100 may then determine an available output torque value based upon the state of charge of swing accumulator 108. The available output torque value may be determined or calculated by the controller 100 as the amount of torque which may be generated or output by directing the fluid within the swing accumulator 108 through motor 241 based upon the state of charge, or charge energy of and available within swing accumulator 108. In particular, a determined state of charge value, and/or the readings or values of one or more of the pressure, volume, temperature signals, etc. as discussed above indicative of the state of charge may be referenced with a lookup table or map, or input into a program by the controller 100 (and stored within the memory thereof) to determine or calculate the available output torque value based upon the available energy output capacity, or state of charge, of the swing accumulator 108 and the fluid therein.

Controller 100 may then compare the determined or calculated available output torque value with reference torque values (which may be set or input and stored within the memory of the controller 100) to determine whether to generate and transmit the appropriate commands to execute a hydraulic start, an electric start, or a combined or "blended" hydraulic and electric start or ignition of engine 59. In particular, controller 100 may then compare the determined or calculated available output torque value in relation to a maximum threshold starting torque value and a minimum threshold starting torque value. The maximum threshold starting torque value may be a value which is established, based on the specific parameters of the system, as corresponding to a threshold torque which may produce an engine 59 speed or rpm sufficient to generate or achieve engine 59 ignition. The minimum threshold starting torque value may be a value which is established, based on the specific parameters of the system, as corresponding to a threshold torque which may be sufficient to assist in generating or achieving engine 59 ignition. If, based on the comparison, which may be executed by the controller 100 utilizing a lookup map or table or program, the determined or calculated available output torque value is equivalent to or greater than the reference maximum threshold starting torque value, controller 100 may cause motor 241 to hydraulically restart engine 59 alone, such as, in one example, by generating and electronically transmitting an engine start command to actuate valve 270 to direct and control the release of pressurized hydraulic fluid from swing accumulator 108 to operatively engage and actuate the motor 241 execute a fully hydraulic start or ignition.

If, based on the comparison, the determined or calculated available output torque value is at or below the minimum threshold starting torque value required to assist in generating engine 59 ignition, controller 100 may generate and electronically transmit an engine start command to actuate electric starting motor 274 to execute a fully electric engine 59 start without any assistance from motor 241. However, if the controller 100 determines that the determined or calculated available output torque value is below or less than the maximum threshold starting torque value but greater than the minimum threshold starting torque value and falls within an intermediate torque generation output range between the minimum and maximum threshold starting torque values, controller 100 may generate and electronically transmit an engine start command, in one example, to actuate valve 270 to direct and control the release of pressurized hydraulic fluid from swing accumulator 108 to operatively engage and actuate the motor 241. Subsequent to sending the command to valve 270 to direct pressurized fluid to motor 241, or alternatively, at substantially the same time, while the pressurized hydraulic fluid from swing accumulator 108 is hydraulically engaging motor 241, controller 100 may generate and electronically transmit an engine start command to activate electric starting motor 274 to engage and supply starting torque to engine 59, such as, for example, via countershaft 71, to assist or supplement the hydraulic torque provided by the swing accumulator 108. As such, the starting torque supplied by the electric starting motor 274 in combination with the starting torque provided by the swing accumulator 108 and operatively engaging motor 241 at a torque corresponding substantially to a determined or calculated available output torque value within the intermediate torque generation output range, may combine to engage engine 59 in concert to supply a combined electrically and hydraulically generated torque which may be at least equivalent to or greater than the reference maximum threshold starting torque value and achieve an engine 59 speed or rpm sufficient to generate or achieve engine 59 ignition. As such, given that the controller 100 may selectively activate and engage electric starting motor 274 when may be necessary to assist or supplement the hydraulic torque provided by the swing accumulator 108 to achieve an engine 59 speed or rpm sufficient to effectuate ignition thereof, the demands in terms of electrical power requirements, activation time, and, in one example, the size of the electric starting motor 247 may be reduced.

Several benefits may be associated with the disclosed hydraulic circuit. For example, because the disclosed circuit may integrate swing and boom circuits during both energy recovery and reuse, a greater amount of energy may be stored and re-used. Further, because the disclosed system may utilize multiple different accumulators, the accumulators may be relatively small, inexpensive, and easy to package. In addition, the size and/or pressure capacity of each of the accumulators may be tailored to provide enhanced performance to each circuit it is connected to. Also, by separating the accumulators with different combinations of valves, the associated fluid may be stored, routed, pressure-enhanced, and/or converted in many different ways. Further, the ability to internally regenerate fluid associated with hydraulic cylinders 28, in combination with energy recovery via motor 241, even higher efficiencies may be realized. And finally, the ability to selectively shut down and hydraulically restart engine 59 (alone or together with electric start motor 274) may improve machine efficiencies by reducing wasteful fuel consumption during idle times.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic start assist system for a machine having an engine, comprising:
   a work tool;
   a pump driven by the engine to pressurized fluid;
   an actuator configured to receive pressurized fluid from the pump and move the work tool;
   an accumulator connected to receive pressurized fluid from the pump and from the actuator;
   an electric starter configured to start the engine; and
   a motor selectively supplied with fluid from the accumulator to assist the electric starter in starting the engine, when the accumulator has a capacity to drive the motor; and a controller wherein the controller is further configured to selectively shut down the engine based on a status of the accumulator.

2. The hydraulic start assist system of claim 1, further including a boom connected between the machine and the work tool, wherein the actuator is a swing motor configured to swing the boom.

3. The hydraulic start assist system of claim 2, wherein:
   the actuator is a first actuator;
   the accumulator is a first accumulator associated with the first actuator;
   the hydraulic start assist system further includes:
      a boom cylinder configured to raise and lower the boom; and
      a second accumulator configured to receive pressurized fluid from the pump and from the boom cylinder; and
   the motor is selectively supplied with fluid from the second accumulator to assist the electric starter in starting the engine.

4. The hydraulic start assist system of claim 1, wherein the motor is configured to selectively start the engine without assistance from the electric starter.

5. The hydraulic start assist system of claim 4, wherein the electric starter is configured to selectively start the engine without assistance from the motor.

6. The hydraulic start assist system of claim 5, further including a controller in communication with the electric starter, the controller being configured to cause the electric starter to start the engine alone, the motor to start the engine alone, or the electric starter and the motor to start the engine together based on the capacity of the accumulator.

7. The hydraulic start assist system of claim 6, wherein the capacity is at least one of a pressure and an amount of fluid stored within the accumulator.

8. The hydraulic start assist system of claim 6, wherein the controller is configured to shut down the engine only when the accumulator has sufficient capacity to restart the engine with the motor alone.

9. The hydraulic start assist system of claim 8, wherein the controller is further configured to cause the accumulator to charge with fluid when it is determined that the accumulator does not have capacity to restart the engine and the engine should be shut down.

10. The hydraulic start assist system of claim 8, wherein the controller is configured to selectively shut down the engine based further on a status and a presence of an operator within the machine.

11. The hydraulic start assist system of claim 10, wherein the controller is configured to selectively shut down the engine when the operator is present in the machine and has been inactive for at least a threshold period of time.

12. The hydraulic start assist system of claim 11, wherein the controller is configured to cause restart of the engine when the operator becomes active after shutdown of the engine.

13. The hydraulic start assist system of claim 12, wherein the controller is configured to cause restart of the engine when a parameter of the machine deviates from a threshold value.

14. The hydraulic start assist system of claim 13, wherein the parameter includes at least one of a battery voltage and a temperature of the engine.

15. The hydraulic start assist system of claim 13, wherein the controller is further configured to:
   track a number of times that the engine is shut down, and selectively inhibit restart of the engine when the number of times that the engine has been shut down exceeds a threshold number.

16. A method of operating a machine having an engine, comprising:
   determining inactivity of a machine operator;
   determining an ability to hydraulically restart the engine; and
   selectively shutting down the engine when the machine operator is inactive and the ability to hydraulically restart the engine exists.

17. The method of claim 16, further including hydraulically restarting the engine with assistance from an electric starter.

18. The method of claim 16, wherein hydraulically restarting the engine includes hydraulically restarting the engine when the machine operator becomes active after engine shutdown.

19. A machine, comprising:
   a frame;
   an engine mounted to the frame;
   a boom;
   a swing motor configured to swing the boom relative to the frame;
   a boom cylinder configured to raise and lower the boom relative to the frame;
   a pump driven by the engine to supply pressurized fluid to the swing motor and to the boom cylinder;
   a first accumulator configured to receive pressurized fluid from the pump and from the swing motor;
   a second accumulator configured to receive pressurized fluid from the pump and from the boom cylinder;
   an electric starter configured to start the engine;
   a hydraulic motor configured to start the engine; and
   a controller configured to:
      determine an activity level of a machine operator;
      determine a status of the first and second accumulators;
      selectively shutdown the engine when the machine operator is inactive and the first and second accumulators have a capacity to drive the hydraulic motor to start the engine alone;
      selectively restart the engine using the electric starter alone, the hydraulic motor alone, or the electric starter and the hydraulic motor together when the machine operator becomes active after engine shutdown and based on the capacity of the first and second accumulators.

* * * * *